United States Patent
Ray et al.

(10) Patent No.: US 9,582,452 B2
(45) Date of Patent: Feb. 28, 2017

(54) SENSOR NETWORK USING PULSE WIDTH MODULATED SIGNALS

(71) Applicant: The Boeing Company, Chicago, IL (US)

(72) Inventors: Gary A. Ray, Issaquah, WA (US); Peter Petre, Oak Park, CA (US)

(73) Assignee: THE BOEING COMPANY, Chicago, IL (US)

(*) Notice: Subject to any disclaimer, the term of this patent is extended or adjusted under 35 U.S.C. 154(b) by 380 days.

(21) Appl. No.: 13/910,851

(22) Filed: Jun. 5, 2013

(65) Prior Publication Data
US 2014/0365702 A1    Dec. 11, 2014

(51) Int. Cl.
| G06F 13/14 | (2006.01) |
| G08B 1/08 | (2006.01) |
| H04J 3/00 | (2006.01) |
| G06F 13/40 | (2006.01) |
| H04L 12/12 | (2006.01) |

(52) U.S. Cl.
CPC .......... *G06F 13/4068* (2013.01); *H04L 12/12* (2013.01)

(58) Field of Classification Search
CPC ................................................. H04W 72/0446
USPC ...................... 710/305; 340/539.22; 370/336
See application file for complete search history.

(56) References Cited

U.S. PATENT DOCUMENTS

| 5,272,476 A | * | 12/1993 | McArthur et al. ........ 340/870.13 |
| 5,396,244 A | * | 3/1995 | Engel ...................... H03F 3/217 |
| | | | 341/143 |
| 5,404,392 A | * | 4/1995 | Miller ............... H04W 72/0446 |
| | | | 455/450 |
| 5,463,624 A | * | 10/1995 | Hogg .................... H04L 12/403 |
| | | | 370/461 |
| 5,469,150 A | * | 11/1995 | Sitte ..................... G05B 19/054 |
| | | | 340/3.1 |
| 5,499,247 A | * | 3/1996 | Matsuda et al. ............... 370/445 |
| 5,593,430 A | * | 1/1997 | Renger ........................... 607/18 |
| 5,878,146 A | * | 3/1999 | Andersen ............. H04R 25/505 |
| | | | 381/312 |
| 5,963,865 A | * | 10/1999 | Desgagne ........... H04W 72/082 |
| | | | 370/329 |

(Continued)

FOREIGN PATENT DOCUMENTS

| EP | 0511744 A2 | 11/1992 |
| EP | 0728621 A2 | 8/1996 |

OTHER PUBLICATIONS

Lazar et al., Perfect Recovery and Sensitivity Analysis of Time Encoded Bandlimited Signals; IEEE Transactions on Circuits and Systems-I: Regular Papers; vol. 51, No. 10; Jan. 22, 2004; (30 pgs).

(Continued)

*Primary Examiner* — Faisal M Zaman
(74) *Attorney, Agent, or Firm* — Toler Law Group, PC

(57) ABSTRACT

A device includes a bus interface to couple to a shared bus of a sensor network. The device also includes a sensor interface to couple to a sensor of the sensor network. The device further includes a gated pulse width modulation circuit coupled to the bus interface and to the sensor interface. The gated pulse width modulation circuit is configured to transmit, during a time slot determined based on a timing signal received via the shared bus, an analog pulse width modulated representation of a signal received from the sensor.

20 Claims, 8 Drawing Sheets

(56) References Cited

U.S. PATENT DOCUMENTS

| | | | |
|---|---|---|---|
| 6,031,823 A * | 2/2000 | Hormel et al. ............... 370/249 |
| 6,844,814 B2 * | 1/2005 | Chin ..................... G08B 25/10 |
| | | | 340/539.11 |
| 7,266,077 B1 | 9/2007 | Daly et al. |
| 7,403,144 B1 | 7/2008 | Cruz-Albrecht et al. |
| 7,466,757 B2 * | 12/2008 | Schuermans et al. ........ 375/257 |
| 7,584,076 B2 * | 9/2009 | Gronauer ............ H04L 12/4035 |
| | | | 340/10.2 |
| 7,750,835 B1 | 7/2010 | Cruz-Albrecht et al. |
| 7,777,656 B2 * | 8/2010 | Hernandez ............ H03M 1/504 |
| | | | 341/118 |
| 7,948,869 B2 | 5/2011 | Petre et al. |
| 8,284,756 B2 * | 10/2012 | Tay ................... H04W 56/0085 |
| | | | 370/314 |
| 2003/0067906 A1 * | 4/2003 | Young ................. H04B 7/2656 |
| | | | 370/347 |
| 2004/0230358 A1 * | 11/2004 | Stam .................... B60Q 1/1423 |
| | | | 701/49 |
| 2006/0122473 A1 * | 6/2006 | Kill et al. .................... 600/300 |
| 2006/0153154 A1 * | 7/2006 | Yoon ....................... H04L 1/188 |
| | | | 370/338 |
| 2007/0076650 A1 * | 4/2007 | Manjeshwar ......... H04W 24/02 |
| | | | 370/328 |
| 2007/0133469 A1 * | 6/2007 | Shin et al. .................... 370/331 |
| 2008/0031139 A1 * | 2/2008 | Muro et al. .................... 370/252 |
| 2008/0232334 A1 * | 9/2008 | Das ....................... H04W 48/08 |
| | | | 370/337 |
| 2008/0309482 A1 * | 12/2008 | Asplund ................ G08B 21/10 |
| | | | 340/539.22 |
| 2009/0122778 A1 * | 5/2009 | Lee ....................... H04W 72/02 |
| | | | 370/345 |
| 2009/0185546 A1 * | 7/2009 | Ross ................ H04W 72/0446 |
| | | | 370/345 |
| 2011/0116414 A1 * | 5/2011 | Lee ....................... H04W 72/08 |
| | | | 370/254 |
| 2011/0149818 A1 * | 6/2011 | Choi .................... H04W 88/08 |
| | | | 370/311 |
| 2011/0173276 A1 * | 7/2011 | Eizips ..................... H02J 3/385 |
| | | | 709/206 |
| 2012/0020336 A1 * | 1/2012 | Bahr ..................... H04W 74/02 |
| | | | 370/336 |
| 2012/0084474 A1 * | 4/2012 | Miskowicz ........... G06F 13/385 |
| | | | 710/106 |
| 2012/0155365 A1 * | 6/2012 | Hollick ............... H04W 72/005 |
| | | | 370/312 |
| 2013/0094481 A1 * | 4/2013 | Jeong ................ H04W 72/0446 |
| | | | 370/336 |
| 2013/0117483 A1 * | 5/2013 | Boeck ................. H04L 12/4035 |
| | | | 710/110 |
| 2014/0105194 A1 * | 4/2014 | Wiatrowski ......... H04B 7/2643 |
| | | | 370/337 |

OTHER PUBLICATIONS

Lazar et al., Sensitivity Analysis of Time Encoded Bandlimited Signals; IEEE; Proceedings of ICASSP'2004, vol. II; May 2004, Montreal, (5 pgs).

Extended EP Search Report for European Application No. 14160966.9-1862 mailed on May 12, 2014, 7 pages.

Office Action for Canadian Application No. 2,845,472—mailed on Jul. 31, 2015; Canadian Intellectual Property Office; 4 pages.

* cited by examiner

SENSOR NETWORK USING PULSE WIDTH MODULATED SIGNALS

FIELD OF THE DISCLOSURE

The present disclosure relates to sensor networks using pulse width modulated signals.

BACKGROUND

Sensor networks may be used to monitor a variety of parameters, such as environmental parameters, structural parameters, or electrical parameters. As a number of sensors included in a sensor network increases, additional infrastructure and communication components are typically needed for the sensor network to be implemented. For a sensor network that includes thousands of sensors, wiring to connect each sensor to a data collection point (e.g., a controller) may be extensive. For example, a wire bundle with one wire per sensor may be used to communicate to the data collection point for processing and response. When implementing the sensor network using the wire bundle, the wire bundle may pose many drawbacks, such as weight, installation costs, cross-connections and interference (e.g., shorting), and poor reliability.

To reduce an amount of wiring used to implement sensor networks, a common medium, such as a bus, may be used for some or all of the sensors. However, implementing a sensor network using the common medium may present difficulties associated with synchronization, configuration, and coordination. For example, a sensor network having the common medium is typically implemented in a digital domain (e.g., communication using digital signals) using digital physical layers (PHY) with protocols, such as an Ethernet protocol, that are much more complex than necessary for simple sensors and that have variable transmission delays that do not meet latency requirements of the sensor network. Additionally, sensor networks that have hundreds or thousands of sensors sharing the common medium have several network management issues (e.g., configuration and coordination) that make using the common medium infeasible.

SUMMARY

Particular embodiments disclosed herein provide a sensor network configured to communicate sensor data via a communication medium (e.g., a common communication medium) using analog signals. The sensor network may include multiple sensors that are each coupled to a corresponding sensor interface device (e.g., a sensor node). Time division multiplexing may be used to enable multiple sensor interface devices to share the communication medium (e.g., a shared bus). Each sensor interface device may be assigned one or more time slots, such as one or more time slots of a plurality of time slots included in a frame. For example, a particular sensor interface device may be assigned one or more time slots during which the particular sensor device may communicate an analog signal (e.g., a pulse width modulated signal that represents sensor data) via the communication medium. The one more time slots may repeat regularly (e.g., during each frame of a plurality of consecutive frames). A timing signal, such as a clock signal or a clock pulse, may be used to synchronize multiple sensor interface devices and to enable each sensor interface device to detect one or more time slots.

A particular sensor interface device may include a gated time encoder circuit, such as an asynchronous sigma-delta modulator circuit. The gated time encoder circuit may generate an asynchronous pulse width representation of sensor data provided by a sensor coupled to the particular sensor interface device. During one or more time slots assigned to the particular sensor interface device, the gated time encoder circuit may be activated (e.g., enabled) to generate an asynchronous pulse width signal (e.g., an analog pulse width modulated signal). A width of the pulse width modulated signal may correspond to a value of the sensor data received from the sensor.

The gated time encoder circuit may include a switch that is activated (e.g., enabled) during one or more time slots to enable the gated circuit to generate and transmit an analog signal (e.g., a pulse width modulated analog signal). The switch may be activated during a duration of a particular time slot and deactivated (e.g., disabled) based on expiration of the particular time slot.

The sensor network may also include a receiver device (e.g., a receiver node) configured to capture (e.g., receive) analog signals communicated via the communication medium. The receiver device may be configured to convert the received analog signals into digital data and to provide the digital data to a system for processing or storage.

The sensor network may be included within a structure or a platform and may be configured to monitor one or more parameters associated with the structure or the platform. For example, the one or more parameters may be associated with a performance or an analysis of the structure or the platform that depends on a large number of sensors (e.g., several hundred or thousand sensors). For example, when the structure or the platform is associated with a wing body of an aircraft, the sensor network may include multiple sensors (e.g., a thousand or more sensors) to monitor parameters, such as joint cracks, air flow, temperature, pressure, that affect flight performance of the aircraft.

By communicating analog signals in a time division multiplexed manner via a communication medium, each sensor interface device does not need to include a corresponding analog to digital conversion circuit. Thus, a sensor network that may include several hundred or thousand sensors all using a common communication medium may maintain a relatively low size, weight, and cost. The relatively low size, weight, and cost of the sensor network may enable one or more sensor networks to be included in a structure or a platform without negatively impacting a performance of the structure or the platform.

In a particular embodiment, a device includes a bus interface to couple to a shared bus of a sensor network. The device also includes a sensor interface to couple to a sensor of the sensor network. The device further includes a gated pulse width modulation circuit coupled to the bus interface and to the sensor interface. The gated pulse width modulation circuit is configured to transmit, during a time slot determined based on a timing signal received via the shared bus, an analog pulse width modulated representation of a signal received from the sensor.

In another particular embodiment, a sensor network comprises multiple sensors, a bus, and multiple sensor interface devices. Each sensor interface device of the multiple sensor interface devices couples a corresponding sensor of the multiple sensors to the bus. A particular sensor interface device of the multiple sensor interface devices includes a bus interface coupled to the bus, a sensor interface coupled to a particular corresponding sensor of the multiple sensors, and a gated pulse width modulation circuit coupled to the bus interface and the to the sensor interface. The gated pulse width modulation circuit is configured to transmit, during a time slot determined based on a timing signal received via the bus, an analog pulse width modulated representation of a signal received from the particular corresponding sensor.

In another particular embodiment, a method includes receiving data from a sensor and receiving a timing signal via a bus. The method also includes transmitting an analog pulse width modulated representation of the data via the bus during a time slot determined based on the timing signal.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

A sensor network includes a plurality of sensors where sensor data is communicated using analog signals via a communication medium, such as a shared bus. The sensor network may include multiple sensors that are each coupled to a corresponding sensor interface device (e.g., a sensor node). Each sensor interface device may include a gated time encoder, such as a gated asynchronous sigma-delta modulator circuit, that is configured to generate an analog signal based on a sensor output. Each sensor interface device may be assigned a time slot during which a corresponding gated time encoder is activated (e.g., enabled) to transmit an analog signal (e.g., an analog pulse width modulated representation of the sensor output) via the communication medium. The sensor interface devices may be synchronized, based on a timing signal provided to each sensor interface device, to identify (e.g., determine) an occurrence of one or more time slots. A particular analog signal transmitted by a first sensor interface device may be received by one or more other sensor interface devices or a receiver device (e.g., a digital receiver device) coupled to the communication medium. The receiver device may convert the particular analog signal to a digital signal to be processed or stored. Thus, the sensor network including the sensor interface devices each having an assigned time slot may operate as an analog time division multiplexed network system to communicate sensor data as analog signals via the communication medium.

Figure 1:
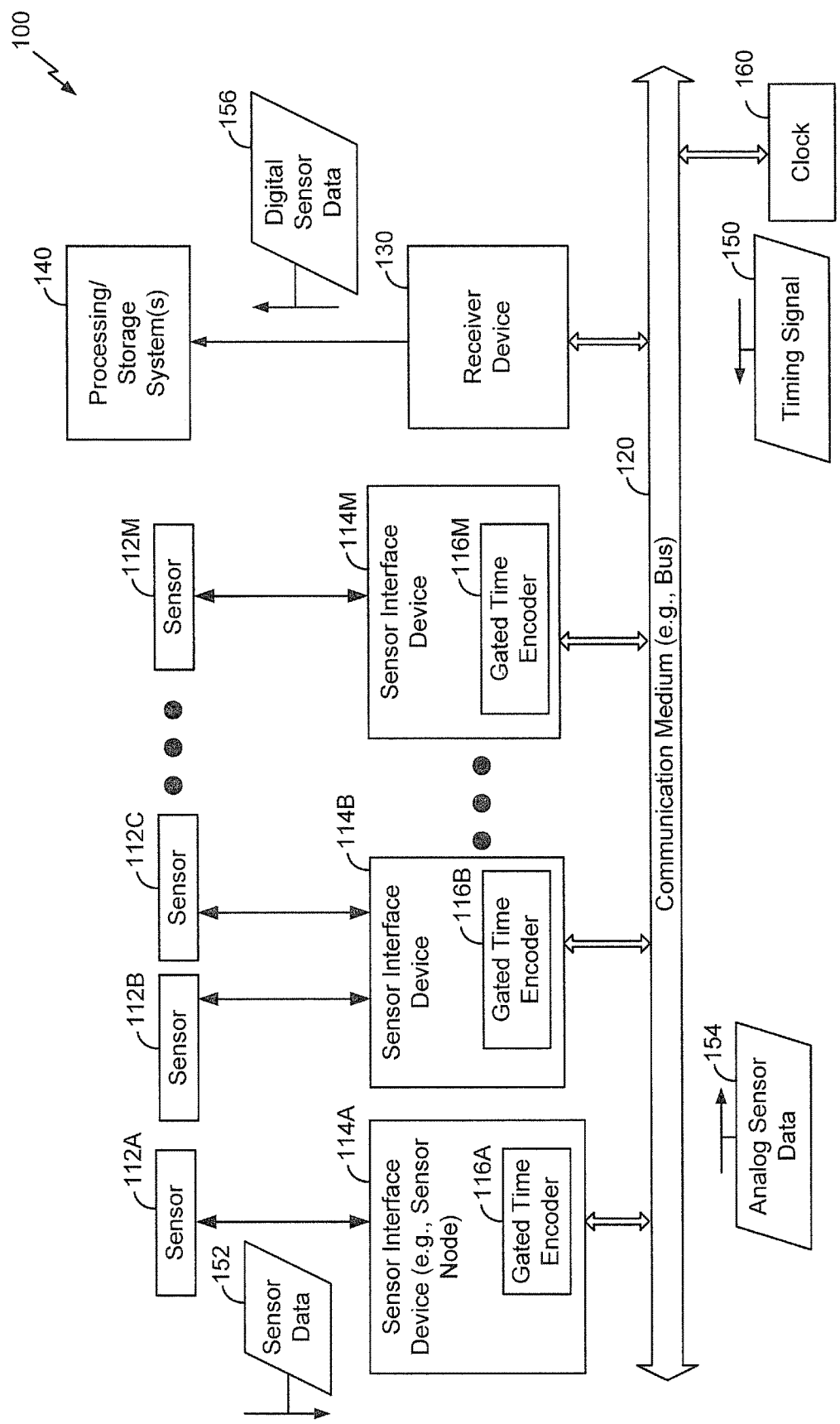
FIG. 1 is a block diagram illustrating a particular embodiment of a sensor network.

FIG. 1 illustrates a system 100 including a sensor network. The system 100 may be included within a structure, such as a building or a bridge, or a platform, such as an aircraft (e.g., a fixed wing aircraft or a rotary wing aircraft), a watercraft, a satellite, a spacecraft, a land craft, or another substantially self-contained structure (e.g., an oil rig) or platform (e.g., a mobile platform or an infrastructure platform). The system 100 may include sensors 112A, 112B, 112C, 112M, sensor interface devices 114A, 114B, 114M, a communication medium 120, a receiver device 130, processing/storage systems 140, and a clock 160.

The system 100 may be configured to implement the sensor network as a time division multiplexed (TDM) network that communicates analog data (e.g., analog signals) via the communication medium 120. A device of the system 100 that communicates the analog data may be assigned a corresponding time slot (e.g., included in a plurality of time slots included in a frame) during which the device is enabled to communicate (e.g., send or receive) analog data. For example, a particular time slot may correspond to a media access time during each frame of a plurality of frames that is allocated to a particular device for communication (e.g., transmission or reception) via the communication medium 120. The particular time slot may be repeated (e.g., during each frame of a plurality of frames) and may enable the particular device to communicate analog data during each of the plurality of frames. Devices that may communicate via the communication medium 120 include the sensor interface devices 114A, 114B, 114M, the receiver device 130, and the clock 160.

The sensors 112A-M may include a first sensor 112A, a second sensor 112B, a third sensor 112C, and a fourth sensor 112M. Although only four sensors 112A-M are shown in the system 100, the system 100 may include fewer than four sensors or more than four sensors. For example, the system 100 may include hundreds or thousands of sensors. Each of the sensors 112A-M may be locally powered (e.g., self-powered) or powered via a corresponding sensor interface device 114A-M, as described with reference to FIG. 3.

Each of the sensors 112A-M may be small in size and configured to determine a value of a parameter, such as an environmental parameter, a structural parameter, an operational parameter, a health parameter, a mechanical parameter, or an electrical parameter, associated with the system 100. The value of the parameter may be determined by the sensor and may be outputted as a voltage value (e.g., sensor data). For example, the first sensor 112A may output the sensor data 152. Each of the sensors 112A-M may monitor (e.g., measure) a different parameter or multiple sensors of the sensors 112A-M may monitor a same parameter.

The sensor interface devices 114A-M may include a first sensor interface device 114A, a second sensor interface device 114B, and a third sensor interface device 114M. The sensor interface devices 114A-M may be communicatively coupled to the communication medium 120 and may be configured to transmit sensor data as an analog signal via the communication medium 120. The sensor interface devices 114A-M (e.g., sensor nodes) may each be coupled to (e.g., via a wired connection) one or more corresponding sensors and may communicate (e.g., send or receive) data, such as sensor data, with the one or more corresponding sensors. For example, the first sensor interface device 114A may be coupled to the first sensor 112A, the second sensor interface device 114E may be coupled to the second sensor 112B and the third sensor 112C, and the third sensor interface device 114M may be coupled to the fourth sensor 112M. Each of the sensor interface devices 114A-M may be communicatively coupled to one or more sensors, such as the sensors 112A-M, via one or more unidirectional connections or bidirectional connections. As shown in the system 100, each of the sensors 112A-M is communicatively coupled to a corresponding sensor interface device 114A-M via a bidirectional connection. However, the sensors 112A-M may be coupled to the corresponding sensor interface devices 114A-M via unidirectional connections, bidirectional connections, or a combination thereof. For example, the first sensor interface device 114A may be communicatively coupled to the first sensor 112A via a unidirectional connection to enable the first sensor interface device 114A to receive data (e.g., sensor data) from the first sensor 112A. As another example, the second sensor interface device 114E may be communicatively coupled to the second sensor 112B via a unidirectional connection to enable the second sensor interface device 114B to receive data (e.g., sensor data) from the second sensor 112B, and may be communicatively coupled to the third sensor 112C via a bidirectional connection to enable the second sensor interface device 114C to send data to the third sensor 114C. As a further example, the third sensor interface device 114M may be communicatively coupled to the fourth sensor 112M via a bidirectional connection to enable the fourth sensor interface device 114M to send and receive data with the fourth sensor 112M.

Each of the sensor interface devices 114A-M may include a corresponding gated time encoder 116A-M. For example, the first sensor interface device 114A may include a first gated time encoder 116A, the second sensor interface device 114B may include a second gated time encoder 116B, and the third sensor interface device 114M may include a third gated time encoder 116M. The gated time encoders 116A-M may each include an asynchronous sigma-delta modulator (ASDM), such as a Schmitt trigger, as described with reference to FIG. 2.

The gated time encoders 116A-M may be configured to convert sensor data received from one of the sensors 112A-M into analog sensor data, such as a pulse width modulated signal representative of the sensor data. For example, a value of the sensor data may be represented based on a pulse width of the pulse width modulated signal. A particular gated time encoder of a particular sensor interface device may be enabled (e.g., selectively enabled) to generate and transmit analog sensor data when a time slot occurs that corresponds to the particular sensor interface device. For example, the first gated encoder 116A may transmit the analog sensor data 154 via the communication medium 120 during the time slot assigned to the first sensor interface device 114A. The analog sensor data 154 may be representative of the sensor data 152 received at the first sensor interface device 114A from the first sensor 112A. In a particular embodiment, the first sensor interface device 114A generates and transmits the analog sensor data 154 during the time slot assigned to the first sensor interface device 114A.

In a particular embodiment, a particular sensor interface device of the sensor interface devices 114A-M may be configured to receive sensor data from multiple sensors 112A-M coupled to the particular sensor interface device. The particular sensor interface device may include a switch (e.g., a particular gated encoder) that is configured to select an individual sensor of the multiple sensors 112A-M coupled to the particular sensor interface device and to transmit analog sensor data based on sensor data received from the individual sensor. The particular gated encoder may select the individual sensor based on one or more time slots of multiple time slots assigned to the particular sensor interface device. For example, the second sensor interface device 114B may be assigned multiple time slots and may be configured to receive sensor data from the second sensor 112B and the third sensor 112C. The second gated time encoder 116B may be configured to selectively transmit a first analog signal based on the second sensor 112B (and not based on the third sensor 112C) during one or more first time slots of the multiple time slots assigned to the sensor interface device 114B. The second gated time encoder 116B may be configured to selectively transmit a second analog signal based on the third sensor 112C (and not on the second sensor 112B) during one or more second time slots of the multiple time slots assigned to the sensor interface device 114B.

The communication medium 120 may enable communication between devices of the system 100. For example, the communication medium 120 may enable communication amongst the sensor interface devices 114A-M, the receiver device 130, and the clock 160. The communication medium 120 may include a physical (metal) wire, a fiber optic cable, a wireless optical link, or a radio frequency (RF) link.

The receiver device 130 (e.g., a digital receiver network node) may be configured to receive analog sensor data, such as the analog sensor data 154, from the sensor interface devices 114A-M. The receiver device 130 may capture (e.g., receive) the analog sensor data communicated via the communication medium 120 and convert the analog sensor data into digital sensor data 156. For example, the receiver device 130, may convert the analog sensor data (e.g., a pulse width modulated analog signal representation of sensor data) into a digital representation of the sensor data (e.g., the digital sensor data 156) using a pulse to digital converter (not shown). In a particular embodiment, the digital sensor data 156 may include the digital representation of the sensor data, a time stamp associated with the sensor data, a sensor identifier corresponding to the sensor 112A-M that generated the sensor data, or a combination thereof, as described with reference to FIG. 4. The receiver device 130 may transmit the digital sensor data 156 to processing/storage system(s) 140.

The processing/storage systems 140 may be coupled to the receiver device 130 and configured to perform one or more operations associated with the digital sensor data. For example, the processing/storage systems 140 may store (e.g., collect) the digital sensor data 156, process the digital sensor data 156, or generate a report based on the digital sensor data 156. The processing/storage systems 140 may include one or more components (not shown) to perform the one or more operations on the digital sensor data 156. For example, the one or more components may include a power supply, a processor, a memory, a processor clock, a display controller, or a combination thereof. The processing/storage systems 140 may be a dedicated system (e.g., dedicated to a sensor network) or a shared system supporting other functionalities (e.g., an electrical system, a mechanical system, or an operational system) associated with the structure or platform that includes the system 100. The processing/storage systems 140 may provide (e.g., transmit) the digital sensor data 156 to an operator associated with the system 100, to a maintenance technician associated with the system 100, to a diagnostic professional associated with the system 100, or to one or more other systems external to the system 100.

The clock 160 may be coupled to the communication medium 120 and configured to generate one or more timing signals (e.g., synchronization signals), such as a timing signal 150. The one or more timing signals may include a clock signal or a synchronization pulse, such as a pulsed signal having a fixed (e.g., constant) width. In a particular embodiment, one or more time slots may be devoted (e.g., assigned) to the timing signal 150 to enable each of the sensor interface devices 114A-M and the receiver device 130 to be synchronized with each other. For example, a first sequential time slot of a frame may include the synchronization pulse sent by the clock 160 and received by each sensor interface devices 114A-M and the receiver device 130. The timing signal 150, such as a clock signal or a clock pulse, may be used to synchronize multiple sensor interfaces devices and to enable each sensor interface to detect a corresponding time slot, as described with reference to FIGS. 3 and 4.

During operation, the timing signal 150 may be transmitted via the communication medium 120 by the clock 160 and may be detected by the sensor interface devices 114A-M and the receiver device 130. Each of the sensor interface devices 114A-M and the receiver device 130 may be synchronized based on the timing signal 150 to enable each of the sensor interface devices 114A-M and the receiver device 130 to identify one or more time slots associated with access to the communication medium 120. For example, the first sensor interface device 114A may be configured to transmit during a first time slot, the second sensor interface device 114E may be configured to transmit during a second time slot and a third time slot, the third sensor interface device 114M may be configured to transmit during a fourth time slot and a fifth time slot. The receiver device 130 may be configured to receive during the first time slot, the second time slot, the third time slot, the fourth time slot, and the fifth time slot.

During the first time slot, the first sensor interface device 114A may receive the sensor data 152 from the first sensor 112A, convert (e.g., generate) the sensor data 152 into analog sensor data 154 that is representative of the sensor data 152, and transmit the analog sensor data 154 via the communication medium 120. For example, the first sensor interface device 114A may generate the analog sensor data 154 using the first gated time encoder 116A and may transmit the analog sensor data 154 as an asynchronous pulse width modulated signal via the communication medium 120.

During the second time slot, the second sensor interface device 114B may generate and transmit analog sensor data that is representative of sensor data received from the second sensor 112B. During the third time slot, the second sensor interface device 114B may generate and transmit analog sensor data that is representative of sensor data received from the third sensor 112C. During the fourth time slot and the fifth time slot, the third sensor interface 114M may generate and transmit analog sensor data that is representative of the sensor data received from the fourth sensor 112M.

The receiver device 130 may receive analog sensor data during one or more time slots. The receiver device 130 may convert the received analog sensor data into digital sensor data and communicate the digital sensor data to the processing/storage systems 140. For example, during the first time slot, the receiver device 130 may receive the analog sensor data 154 transmitted by the first sensor interface device 114A. After receiving the analog sensor data 154, the receiver device 130 may convert the analog sensor data 154 to the digital sensor data 156 that corresponds to the sensor data 152 generated by the first sensor 112A. The receiver device 130 may communicate the digital sensor data to the processing/storage systems 140.

The system 100 may be configurable to operate in one or more network configurations. For example, in a first network configuration shown in FIG. 1, all of the sensors 112A-M may send sensor data to a central location, such as the processing/storage systems 140. In the first network configuration, the sensor data is sent to the central location via the sensor interface devices 114A-M, the communication medium 120, and the receiver device 130.

In a second network configuration, the sensors 112A-M may communicate sensor data between one another via the sensor interface devices 114A-M and the communication medium 120. For example, in the second configuration, the system 100 may not include the receiver device 130 or the processing/storage systems 140. To enable the second network configuration, each sensor interface device 114A-M may include a receiver circuit portion, as described with reference to FIGS. 2 and 3. For example, the receiver circuit portion of a particular sensor interface may enable the particular sensor interface to receive an analog sensor signal, such as the analog sensor data 154, that is representative of a sensor signal and to reconstruct the sensor signal (e.g., a voltage value).

In a third network configuration, one or more of the sensors 112A-M or one or more of the sensor interface devices 114A-M of the system 100 may include a digital processing portion. The digital processing portion may be configured to process digital sensor signals. Accordingly, the communication medium 120 may be configured to support communication of the digital sensor signals, the analog signals, or a combination thereof, via a single communication path or via different communication paths. In a particular embodiment of the third network configuration, each sensor interface devices 114A-M includes a corresponding receiver device configured to receive one or more analog signals via the communication medium 120 and a corresponding pulse to digital converter configured to convert the received analog signals into digital signals.

Other network configurations may be possible, such as a network including characteristics of the first network configuration, the second network configuration, the third network configuration, or a combination thereof. For example, another network configuration may include one or more first nodes (e.g., sensor interface devices) configured to communicate analog signals, such as the analog sensor data 154, to other sensor nodes and to a receiver device, such as the receiver node 130. In the other network, one or more second nodes may include digital processing and may be configured to communicate and process digital signals.

In a particular embodiment, a particular sensor interface device of the sensor interface devices 114A-M may be self-powered, powered by a sensor coupled to the particular sensor interface device, powered via the communication medium 120 by a device or power source coupled to the communication medium 120, inductively powered (e.g., powered via an ambient power), or a combination thereof.

The sensor network of the system 100 may advantageously enable several hundred or thousand sensors to communicate sensor data using a communication medium (e.g., a common communication medium). Sensor interface devices may interface with the sensors and communicate sensor data as analog signals via the communication medium. By communicating analog signals, the sensor interface devices are not required to include analog to digital conversion circuitry. Accordingly, the sensor network of the system 100 provides sensor data to be communicated in a coordinated manner without a complex protocol that is used when transmitting digital data. Each sensor or sensor interface device may be assigned one or more time slots during which the sensor or sensor interface device may access the communication medium in a time division multiplexed manner. Because each sensor or sensor interface device is assigned the one or more time slots, multiple sensor or multiple interface devices do not need to compete or wait to access the communication medium. By not having to compete to access the communication medium, transmission delays and communication latency issues may be avoided in the system 100.

Figure 2:
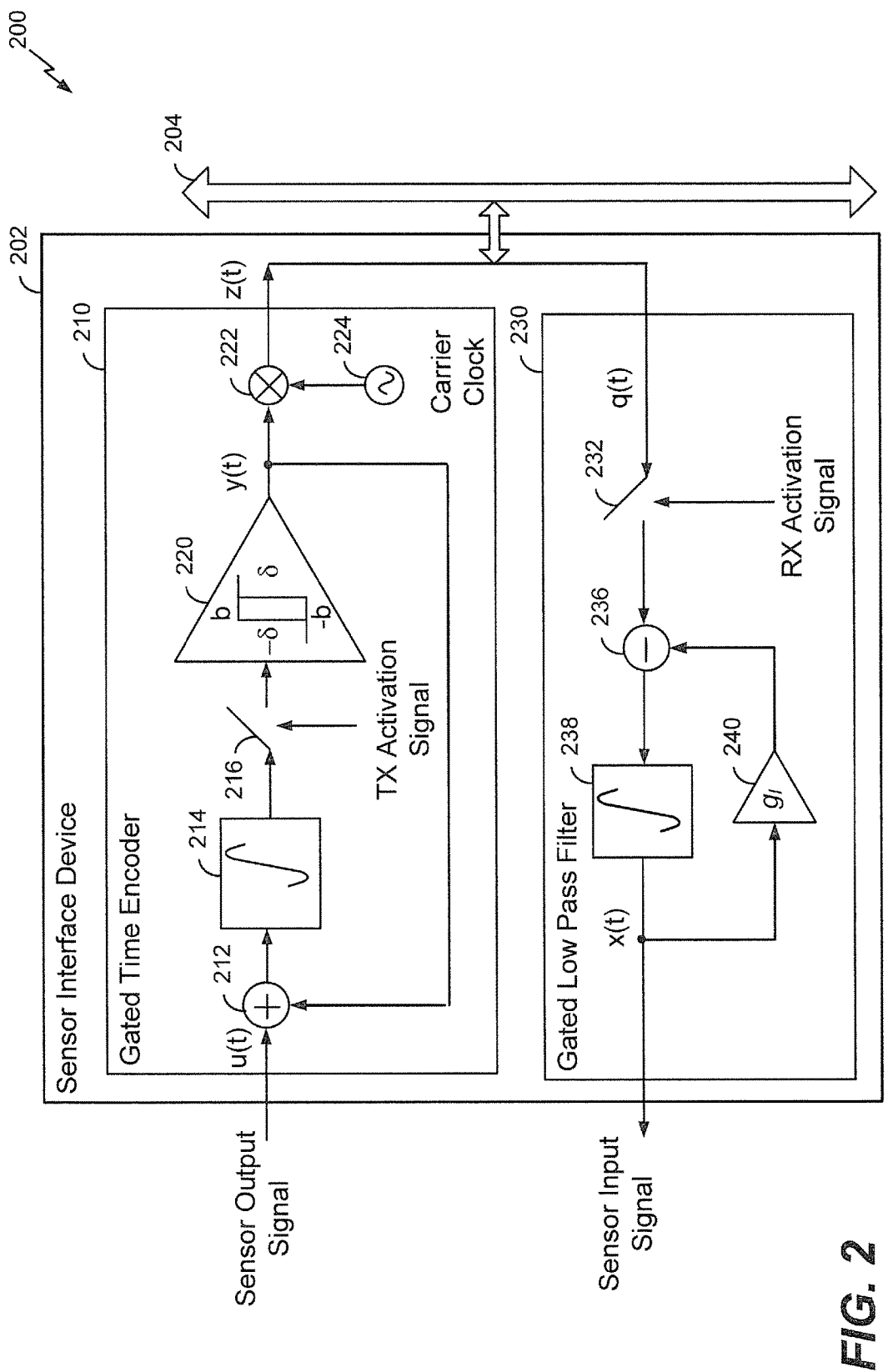
FIG. 2 is a block diagram illustrating a first particular embodiment of a sensor interface device.

Referring to FIG. 2, a particular embodiment of a system 200 including a sensor interface device 202 and a communication medium 204 is shown. For example, the sensor interface device 202 and the communication medium 204 may include one of the sensor interface devices 114A-M and the communication medium 120, respectively, of FIG. 1.

The sensor interface device 202 may include a gated time encoder 210, such as an asynchronous sigma-delta modulator, and a gated low pass filter 230, such as a gated leaky integrator low pass filter. For example, the gated time encoder 210 may include one of the gated time encoders 116A-M of FIG. 1. In a particular embodiment, the gated time encoder 210 includes a Schmitt trigger. In a particular embodiment, the sensor interface device 202 may not include the gated low pass filter 230. The sensor interface device 202 may be communicatively coupled to the communication medium 204 such that the sensor interface device 202 may transmit a first analog signal via the gated time encoder 210 and receive a second analog signal via the gated low pass filter 230. The sensor interface device 202 may be coupled to a sensor (not shown), such as one of the sensors 112A-M of FIG. 1. The sensor interface device 202 may be configured to receive a sensor output signal, such as the sensor data 152 of FIG. 1, from the sensor and to send a sensor input signal to the sensor. The sensor input signal may be associated with a voltage value output generated by a particular sensor communicatively coupled to the sensor interface device 202 via the communication medium 204.

The gated time encoder 210 may receive a sensor output signal u(t) from the sensor and may generate an analog output signal z(t) that is a pulse width modulated representation of the sensor output signal u(t). A value oft may be associated with time and thus a value of the sensor output signal u(t) and a value of the output signal z(t) may vary over time.

The gated time encoder 210 may include an adder 212, an integrator 214, a switch 216 (e.g., a gate), a hysteresis element 220, and a mixer 222. The adder 212 may receive the sensor output signal u(t) from the sensor and a hysteresis element output signal y(t) as a feedback signal. An output of the adder 212 may be provided to the integrator 214. The integrator 214 may perform an integration operation on the output of the adder 212. An output of the integrator 214 may be provided to the hysteresis element 220 based on an operational state of the switch 216. A pulse width modulated signal of the sensor output signal u(t) (e.g., a voltage value) may be represented by a duration of a pulse (e.g., a pulse width). For example, a larger amplitude of the voltage signal outputted by the sensor may be encoded by a longer pulse (e.g., the pulse width) of the analog signal. In a particular embodiment, the pulse of the analog signal can begin or end at any time within a time slot. In another particular embodiment, the width of the pulse may begin in a first time slot and end in a second time slot.

The switch 216 may be operated based on a transmit (TX) activation signal to selectively activate and deactivate the gated time encoder 210. For example, the TX activation signal may enable the gated time encoder 210 during a time slot assigned to the sensor interface device 202 by operating the switch 216. The TX activation signal may be generated based on a timing signal, such as the timing signal 150 of FIG. 1, as described with reference to FIG. 3. When the gated time encoder 210 is not enabled, the switch 216 may be open (e.g., deactivated), and the output of the integrator 214 may not be provided to the hysteresis element 220. When the switch 216 is open, the gated time encoder 210 may not output an analog sensor signal z(t) or may output the analog sensor signal z(t) having a value of zero (e.g., a null value). When the gated time encoder 210 is enabled, the switch 216 may be closed (e.g., activated), and the output of the integrator 214 may be provided to the hysteresis element 220. When the switch 216 is closed, the gated time encoder 210 may be enabled to produce an analog sensor signal z(t).

The hysteresis element 220 (e.g., a signal-dependent sampling mechanism) may operate according to a non-inverting hysteresis curve having design parameters b and δ. For example, b and −b may be output values of the hysteresis element 220 and δ and −δ may be triggering marks (e.g., hysteresis values). A transition of the output from −b to b or vice-versa takes place every time the output of the integrator 214 reaches the triggering mark δ or −δ (e.g., the hysteresis values), as explained herein. The hysteresis element output signal y(t) may have two modes of operation associated with hysteresis element output signal y(t) values of b and −b. In a first mode of operation, when the hysteresis element output signal y(t) is −b, the output of the integrator 214 that is input into the hysteresis element 220 may increase in value from −δ towards δ. When the output of the integrator 214 reaches the upper trigger value δ, the hysteresis element output signal y(t) may be triggered to transition from −b to b and the feedback provided to the adder 212 becomes negative.

In a second mode of operation, when the hysteresis element output signal y(t) is b, the output of the integrator 214 that is input into the hysteresis element 220 may decrease in value from δ towards −δ. When the output of the integrator 214 reaches the lower trigger value −δ, the hysteresis element output signal y(t) may be triggered to transition from b to −b and the feedback provided to the adder 212 becomes positive. Thus, while the transition times of the hysteresis element output signal y(t) are non-uniformly spaced, amplitudes of the hysteresis element output signal y(t) remain constant (e.g., b or −b). Accordingly, the hysteresis element output signal y(t) may include an analog signal that represents a value of the sensor output signal u(t) received by the gated time encoder 210. By using the switch 216 to enable the gated time encoder 210 based on the TX activation signal (e.g., corresponding to a time slot), the analog signal of the hysteresis element output signal y(t) may lie (e.g., be generated) within the time slot. A pulse width of the hysteresis element output signal y(t) (e.g., the analog pulse width modulated signal) represents a value associated with the sensor output signal u(t). Because the hysteresis element output signal y(t) generated using the hysteresis element 220 that does not use a clock (e.g., a clock signal), the hysteresis element output signal y(t) does not suffer from timing jitter (e.g., a clock jitter).

To further ensure that the hysteresis element output signal y(t) (e.g., an analog pulse signal) does not suffer from timing jitter, the sensor output signal u(t) that is input into the gated time encoder 210 may be translated (e.g., conditioned) to lie between voltage bounds prior to being received by the gated time encoder 210. For example, the sensor output signal u(t) may be translated to lie between voltage bounds that are associated with a gating rate of the gated time encoder 210 or associated with a frame (e.g., sampling) rate of a sensor network that includes the sensor interface device 202. In a particular embodiment, the sensor output signal u(t) having a first voltage range (e.g., a voltage range) of [−c, c] is translated into a second voltage range within [−b, b], so that the time gated time encoded signal can be used to recover the original signal. The hysteresis element output signal y(t) (e.g., the analog pulse width modulated signal) generated using the hysteresis element 220 may be used by another circuit or device to reconstruct the sensor output signal u(t). For example, the sensor output signal u(t) may be reconstructed using one or more processes (e.g., methods), such as a low pass filter process, a thresholding process, or a pulse correlation process.

The hysteresis element output signal y(t) may be provided to the mixer 222. The mixer 222 may mix the hysteresis element output signal y(t) with a carrier clock 224 (e.g., a carrier frequency). Mixing the hysteresis element output signal y(t) (e.g., the analog pulse width modulated signal) with the carrier clock 224 may generate analog sensor signal z(t), such as the analog sensor data 154 of FIG. 1, having pulses with positive carrier frequencies that enable both pulse correlation and pulse radio frequency (RF) transmission. In a particular embodiment, the gated time encoder 210 may not include the mixer 222 and the hysteresis element output signal y(t) may be provided (e.g., sent) to the communication medium 204 as the analog sensor signal z(t).

The gated low pass filter 230 may receive an analog signal q(t) (e.g., an analog pulse width modulated signal), such as the analog sensor data 154 of FIG. 1, from the communication medium 204 and generate a sensor input signal x(t) based on the analog signal q(t). The sensor input signal x(t) may be provided (e.g., sent) to one or more sensors coupled to the sensor interface device 202. The sensor input signal x(t) may include a command for the one or more sensors or may include a sensor output signal provided by a sensor communicatively coupled to the sensor interface device 202 via the communication medium 204.

The gated low pass filter 230 may include a switch 232, a subtractor 236, an integrator, and a gain 240 (e.g., a leakage gain). The switch 232 may receive the analog signal q(t) from the communication medium 204. The switch 232 may be operated based on a receive (RX) activation signal to selectively activate and deactivate the gated low pass filter 230. For example, the RX activation signal may enable the gated low pass filter 230 during a time slot assigned to the sensor interface device 202 by operating the switch 232. The RX activation signal may be generated based on a timing signal, as describe with reference to FIG. 3. The time slot during which the gated low pass filter 230 is activated may be a same time slot when the gated time encoder is enabled or may be a different time slot than when the gated time encoder 210 is enabled. When the gated low pass filter 230 is not enabled, the switch 232 may be open (e.g., deactivated), and the analog signal q(t) may not be provided to the subtractor 236. When the switch 232 is open, the gated low pass filter 230 may not output the sensor input signal x(t) or may output the sensor input signal having a fixed value. When the gated low pass filter 230 is enabled, the switch 232 may be closed (e.g., activated), and the analog signal q(t) may be provided (e.g., sent) to the subtractor 236. When the switch 232 is closed, the gated low pass filter 230 may be enabled to produce the sensor input signal x(t).

The subtractor 236 may receive the analog signal q(t) via the switch 232 and may receive an output of a gain 240. The gain 240 may apply a gain value (e.g., a leaky value) of $g_1$ to the sensor input signal x(t) outputted by the integrator 238. An output of the subtractor 236 may be provided to the integrator 238. The integrator 238 may perform an integration operation on the output of the subtractor 236 to generate the sensor input signal x(t).

During operation, the gated time encoder 210 of the sensor interface device 202 may be selectively enabled during a first time slot. When the gated time encoder 210 is electively enabled, the gated time encoder 210 may generate the analog sensor signal z(t) based on the sensor output signal u(t). In a particular embodiment, the analog sensor signal z(t) includes an analog pulse width modulated signal having a pulse width that is representative of a value of the sensor output signal u(t). The analog sensor signal z(t) generated during the first time slot may be transmitted by the gated time encoder 210 via the communication medium 204 during the first time slot.

During a second time slot, the gated low pass filter 230 of the sensor interface device 202 may be selectively enabled. When the gated low pass filter 230 is selectively enabled, the gated low pass filter 230 may receive the analog signal q(t) from the communication medium 204. The gated low pass filter 230 may generate a sensor input signal x(t) based on the analog signal q(t). The gated low pass filter 230 may send the sensor input signal x(t) to the sensor coupled to the gated low pass filter 230.

The system 200 may advantageously provide a sensor interface device configured to transmit and receive analog signals associated with a sensor coupled to the sensor interface device. The sensor interface device may be a relatively simple device and is not required to perform analog to digital conversion. Additionally, by determining and setting one or more parameters of the sensor interface device, the sensor interface device may transmit an analog signal that is representative of sensor data without suffering from timing jitter (e.g., a clock jitter).

Figure 3:
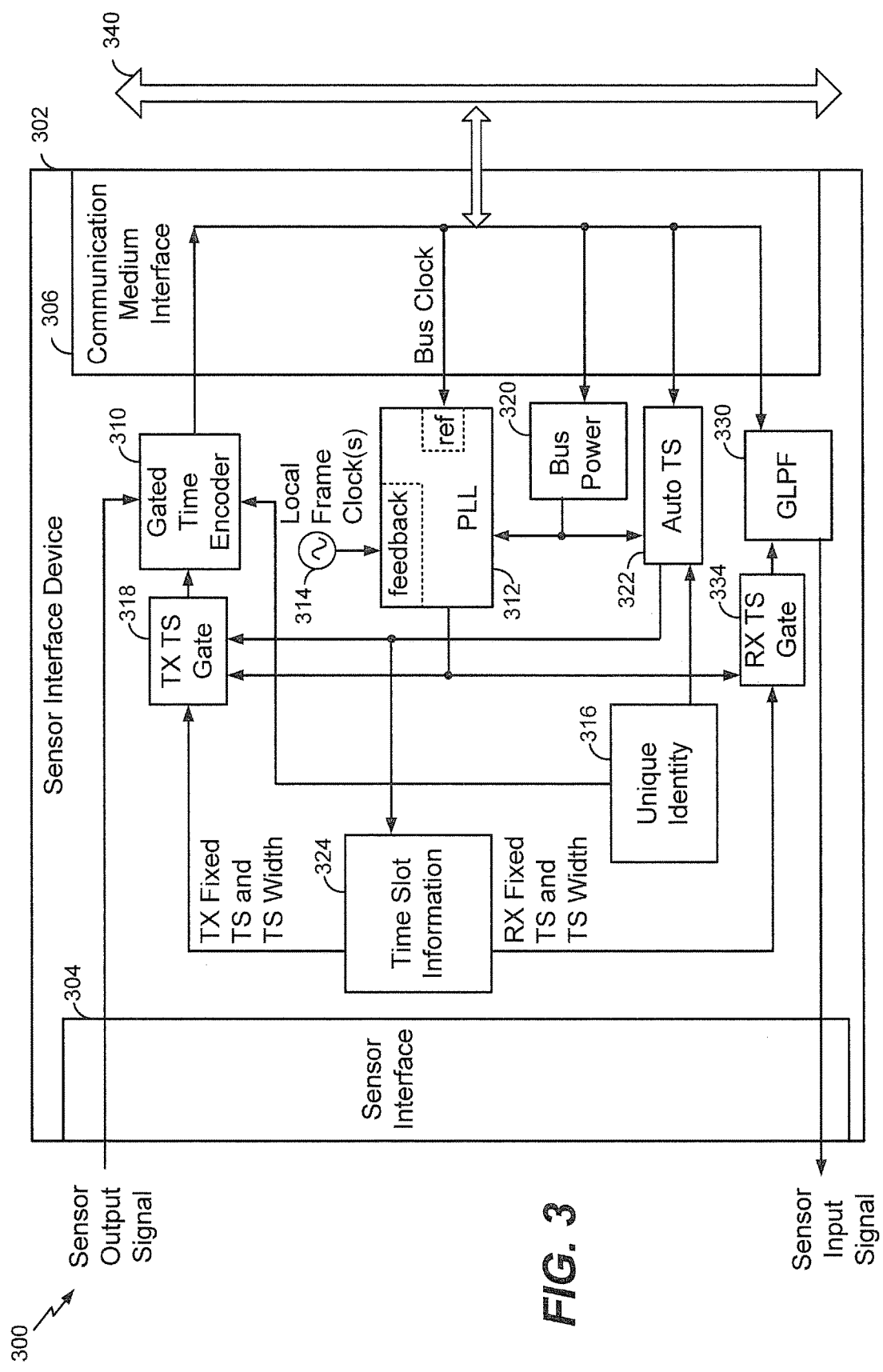
FIG. 3 is a block diagram illustrating a second particular embodiment of a sensor interface device.

Referring to FIG. 3, a particular embodiment of a system 300 including a sensor interface device 302 and a communication medium 340 is shown. For example, the sensor interface device 302 may include one of the sensor interface devices 114A-M of FIG. 1 or the sensor interface device 202 of FIG. 2. The communication medium 340 may include the communication medium 120 of FIG. 1 or the communication medium 204 of FIG. 2.

The sensor interface device 302 may include a sensor interface 304, a communication medium interface 306, and one or more components. The sensor interface device 302 may be coupled to a sensor (not shown), such as one or more of the sensors 112A-M of FIG. 1, via the sensor interface 304. The sensor interface device 302 may be communicatively coupled to the communication medium 340 via the communication medium interface 306.

The one or more components included in the sensor interface device 302 may include a TX time slot (TS) gate 318, a gated time encoder 310, one or more local frame clocks 314, a phase lock loop (PLL) 312, a bus power circuit 320, a unique identity device 316, a TS information device 324, an automatic TS device 322, a RX TS gate 334, and a gated low pass filter 330. For example, the gated time encoder 310 may include one or the gated time encoders 116A-M of FIG. 1 or the gated time encoder 210 of FIG. 2. The gated low pass filter 330 may include the gated low pass filter 230 of FIG. 2.

The sensor interface device 302 may receive power from the communication medium 340 via the communication medium interface 306. For example, one or more components of the sensor interface device 302 may be powered by one or more signals received at the bus power circuit 320. In a particular embodiment, the bus power circuit 320 is or includes a diode. In the embodiment depicted in FIG. 3, the PLL 312 and the automatic TS device 322 are powered by the bus power circuit 320. Alternatively or additionally, the bus power circuit 320 may include a power source that provides power to one or more components of the sensor interface device 302. The bus power circuit 320 may also provide power via the sensor interface 304 to the sensor coupled to the sensor interface device 302.

The sensor interface device 302 may receive a bus clock signal, such as the timing signal 150 of FIG. 1, from the communication medium 340 via the communication medium interface 306. When the sensor interface device 302 is included in a sensor network, such as the sensor network of the system 100 of FIG. 1, that is implemented as a time division multiplexed (TDM) network, the sensor interface device 302 may be synchronized to a system clock to enable the sensor interface device 302 to identify one or more time slots. For example, the sensor interface device 302 may receive one or more timing signals that may include a clock signal, a synchronization pulse (e.g., a pulsed signal having a fixed or constant width), or both. The one or more timing signals may be associated with the system clock, such as the clock 160 of FIG. 1, having a frequency based on period of a frame used in a TDM system (e.g., a time-slotted system). For example, the sensor network may operate over a period of time including a plurality of frames. Each of the frames may include a plurality of time slots. In a particular embodiment, a particular timing signal may be provided to the sensor interface device 302 during an initial time slot of each frame of the plurality of frames. The sensor interface device 302 within the sensor network may be assigned one or more time slots of the plurality of time slots during which the sensor interface device 302 may access (e.g., communicate via) the communication medium 340 in each frame of the plurality of frames. In a particular embodiment, the one or more time slots assigned to the sensor interface device 302 may be consecutive time slots within a frame.

In a particular embodiment, the sensor interface device 302 may maintain one or more local frame clocks 314 that are each synchronized based on the system clock. The sensor interface device 302 may synchronize the one or more local frame clocks 314 to the system clock based on the one or more timing signals received via the communication medium 340. The one or more local frame clocks 314 may be configured to enable a corresponding time slot assigned to the sensor interface device 302 to be identified. For example, a particular local frame clock 314 may be offset from a timing signal based on the system clock by an amount that corresponds to a time slot assigned to the sensor interface device 302. In a particular embodiment, a first local frame clock may be included in or coupled to the TX TS gate 318 and a second local frame clock may be included in or coupled to the RX TS gate 334, as described further herein.

The local frame clocks 314 may drift over time and may be re-synchronized to maintain an appropriate offsets of the local frame clocks 314 to the system clock. For example, the PLL 312 may be used to synchronize the local frame clocks 314 to the system clock (e.g., the bus clock). The PLL 312 may include a reference portion and a feedback portion. The PLL 312 may receive the bus clock (e.g., the timing signal) at the reference portion from the communication medium 340 via the communication medium interface 306. In a particular embodiment, at least one time slot may be dedicated (e.g., devoted) to timing signals that may be used for synchronization and, optionally, for power distribution (e.g., for use by the bus power circuit 320). The PLL 312 may determine an output signal for each of the local frame clocks 314 received by the feedback portion of the PLL 312. The PLL 312 may send the output signal to the corresponding local frame clock for which the output signal was determined. For example, the PLL 312 may send an output signal based on the first local frame clock to the TX TS gate 318 to enable the first local frame clock to maintain synchronization with the system clock.

The time slot information device 324 may include (e.g., store) information associated with one or more time slots assigned to the sensor interface device 302. For example, the time slot information device may include a storage device, such as a memory, a register, a dip switch, jumpers, fuses, or any other means to store information. The time slot information may include a TX fixed TS (e.g., a transmit time slot identifier), a RX fixed TS (e.g., a receive time slot identifier), a time slot width, or a combination thereof. For example, the TX fixed TS may include one or more time slots assigned to the sensor interface device 302 that indicate (e.g., identify) when the gated time encoder 310 is to be activated to transmit an analog signal (e.g., an analog pulse width modulated signal). As another example, the RX fixed TS may include one or more time slots assigned to the sensor interface device 302 that indicate when the gated low pass filter 330 is to be activated to receive an analog signal.

The TX fixed TS, or the RX fixed TS, may be programmed (e.g., manually) into the time slot information device 324. However, when a sensor network including the sensor interface device 302 includes hundreds or thousands of sensors and sensor interface devices, programming each sensor interface device may be impractical. Accordingly, the automatic TS device 322 may be configured to automatically select (e.g., assign) a time slot for the gated time encoder 310 to use. The automatic TS device 322 (e.g., a time slot assignment device) may be configured to monitor the communication medium 340 (e.g., monitor the bus). For example, the automatic TS device 322 may monitor one or more time slots within a time period to determine whether or not a particular time slot is occupied by (e.g., allocated to) another device based on whether an analog signal is communicated during the particular time slot. The time period may include a number of consecutive frames. The number of consecutive frames may be equal to a number of time slots included in each frame of a plurality of consecutive frames. For example, when ten time slots are included in each frame, the number of consecutive frames may be equal to ten. In a particular embodiment, the automatic TS device 322 monitors the communication medium 340 for the number of consecutive frames or a number of consecutive time slots. When the automatic TS device 322 determines that the particular time slot has been unoccupied for the number of frames, the automatic TS device 322 may set the TX fixed TS to a value associated with the particular time slot.

In a particular embodiment, the automatic TS device 322 may monitor a time slot based on an identifier of the sensor interface device 302. For example, the unique identity device 316 may store the identifier of the sensor interface device 302, and the identifier may be available to the automatic TS device 322. Each sensor interface device included in the system 300 may include a corresponding identifier (e.g., a unique identifier) of a plurality of sequentially issued identifiers. The automatic TS device 322 may select an initial time slot to monitor based on a value of the identifier received from the unique identity device 316. If the initial time slot is available (e.g., unoccupied), the automatic TS device 322 may select the initial time slot as a value of the TX fixed TS. If the initial time slot is not available, the automatic TS device 322 may select another time slot (e.g., a next sequential time slot after the initial time slot) to be monitored. If the next sequential time slot is available, the automatic TS device 322 may select the next sequential time slot as a value of the TX fixed TS. If the next sequential time slot is not available, the automatic TS device 322 may continue to select additional time slots in a round robin fashion until the automatic TS device 322 has identified a vacant time slot of a plurality of time slots have been checked.

A portion of the time slot information may be provided from the time slot information device 324 to the TX TS gate 318 or the RX TS gate 334. For example, the time slot information device 324 may provide the TX fixed TS and the TS width to the TX TS gate 318. As another example, the time slot information device 324 may provide the RX fixed TS and the TS width to the RX TS gate 334. Alternatively or additionally, the portion of the time slot information provided to the TX TS gate 318 or the RX TS gate 334 may be provided from a device external to the sensor interface device 302 via the sensor interface 304 or the communication medium interface 306. In a particular embodiment, the sensor interface device 302 does not include the time slot information device 324, and the time slot information is provided to the TX TS gate 318 or the RX TS gate from the external device.

The TX TS gate 318 (e.g., a TX gate controller) may be configured to identify an occurrence of one or more time slots based on the TX fixed TS. The TX TS gate 318 may generate an activation signal that activates (e.g., enables) the gated time encoder 310 to transmit an analog signal, such as the analog sensor data 154 of FIG. 1. For example, the TX TS gate 318 may receive the TX fixed TS from the time slot information device 324 and identify when a time slot identified by the TX fixed TS occurs based on the first local clock included in the TX TS gate 318. Based on the occurrence of the time slot, the TX TS gate 318 may provide the activation signal, such as the TX activation signal of FIG. 2, to activate the gated time encoder 310. For example, the TX TS gate 318 may send the activation signal to the gated time encoder 310 to initiate activation of a switch of the gated time encoder 310 when the time slot begins.

When the gated time encoder 310 is activated, the gated time encoder 310 may be configured to receive a sensor output signal from a sensor via the sensor interface and to generate an analog signal that is representative of the sensor output signal. For example, the sensor may include one of the sensors 112A-M of FIG. 1. The analog signal may include an analog asynchronous pulse width modulated signal that is transmitted by the gated time encoder 310 to the communication medium 340 via the communication medium interface 306.

In a particular embodiment, the sensor interface device 302 is configured to receive multiple sensor output signals. The multiple sensor output signals may be received at a selector (not shown) distinct from or included in the gated time encoder 310. The selector may select one of the multiple sensor output signals to be received by the gated time encoder 310 based on one or more time slots assigned to the sensor interface device 302. For example, the time slot information device 324 may identify one or more first time slots (e.g., one or more first TX fixed time slots) associated with a first sensor output signal and may identify one or more second time slots (e.g., one or more second TX fixed time slots) associated with a second sensor output signal. The TX TS gate 318 may receive the one or more first TX fixed time slots and the one or more second TX fixed time slots from the time slot information device 324. The TX TS gate 318 may provide one or more activation signals, based on an occurrence of the one or more first TX fixed time slots or the one or more second TX fixed time slots, to enable the selector to select first sensor output signal or the second sensor output signal. In a particular embodiment, the one or more activation signals to enable the selector to select the first sensor output signal or the second sensor output signal may further operate to enable the gated time encoder 310 to generate an analog signal that is representative of the selected sensor output signal during the one or more first TX fixed time slots or the one or more second TX fixed time slots.

The RX TS gate 334 (e.g., a RX gate controller) may be configured to identify an occurrence of one or more time slots based on the RX fixed TS. The RX TS gate 334 may generate an activation signal that activates (e.g., enables) the gated low pass filter 330 to receive an analog signal. For example, the RX TS gate 334 may receive the RX fixed TS from the time slot information device 324 and may identify when a time slot identified by the RX fixed TS occurs based on the second local clock included in the RX TS gate 334. Based on the occurrence of the time slot, the RX TS gate 334 may provide the activation signal, such as the RX activation signal of FIG. 3, to activate the gated low pass filter 330.

When the gated low pass filter 330 is activated, the gated low pass filter 330 may be configured to receive an analog signal via the communication medium interface 306 and to generate a sensor input signal to be sent to the sensor via the sensor interface 304. The analog signal may include an analog asynchronous pulse width modulated signal that includes sensor data from another sensor or a command signal. The sensor may receive the sensor input signal and generate a sensor output signal based in part on the sensor data from the other sensor or may perform one or more operations (e.g., power on or power off) based on the command signal.

In a particular embodiment, the sensor interface device 302 is configured to selectively provide the sensor input signal to one or more sensors. The sensor input signal may be selectively provided to the one or more sensors via a selector (not shown) distinct from or included in the gated low pass filter 330. The selector may select the one or more sensors based on one or more time slots assigned to the sensor interface device 302. For example, the time slot information device 324 may identify one or more first time slots (e.g., one or more first RX fixed time slots) associated with a first sensor and may identify one or more second time slots (e.g., one or more second RX fixed time slots) associated with a second sensor. The RX TS gate 334 may receive the one or more first RX fixed time slots and the one or more second RX fixed time slots from the time slot information device 324. The RX TS gate 334 may provide one or more activation signals, based on an occurrence of the one or more first RX fixed time slots or the one or more second RX fixed time slots, to enable the selector to select the first sensor or the second sensor.

The sensor interface device 302 may be configured to communicate a value of the identity (e.g., a node identifier) of the sensor interface device 302 stored in the unique identity device 316 via the communication medium 340. The identity (e.g., an identifier) may include an n-bit binary number. For example, when the sensor interface device 302 automatically joins a sensor network using the automatic TS device 322, the sensor interface device 302 may transmit the identity to identify the sensor interface device 302 to one or more other devices in the sensor network. The sensor interface device 302 may transmit the identity using the gated time encoder 310 during a time slot based on the TX fixed TS. For example, the unique identity device 316 may send the identity to the gated time encoder 310 and the gated time encoder 310 may transmit an analog signal having a pulse width that represents the value of the identity. As another example, the unique identity device 316 may send the identity to the gated time encoder 310, and each bit of the identity may be sent during a different time slot by the gated time encoder 310. For example, the gated time encoder 310 may send an individual bit by transmitting an analog sensor value for a bit value of zero (one) and sending no value for a bit value of one (zero). In a particular embodiment, the sensor interface device 302 may transmit the identity of the sensor interface device 302 every p number of frames, where p is an integer. A receiver device, such as the receiver device 130 of FIG. 1, may be configured to receive and store the identity transmitted by the sensor interface device 302, as described with reference to FIG. 4. Therefore, the gated time encoder 310 may be configured to transmit an analog signal representative of a sensor signal received from a sensor during a particular time slot of a first frame of the plurality of frames and to transmit at least a portion of an identity of the sensor interface device 302 during the particular time slot of a second frame of the plurality of frames.

In a particular embodiment, when the sensor interface device 302 is configured to receive multiple sensor output signals, the sensor interface device 302 further communicates an identity of a particular sensor that corresponds to each sensor output signal of the multiple sensor output signals. When a first sensor output signal corresponding to a first sensor is sent during a first time slot, the unique identity device 315 may indicate the identity of the sensor interface device 302 and a first sensor identifier corresponding to the first sensor. The first sensor identifier may be transmitted along with the identity of the sensor interface device 302, as explained above. For example, when the identity includes the n-bit number, the sensor identifier may include one or more bits appended to the n-bit number. The first sensor identifier may be provided to the gated time encoder 310 from the unique identity device 315, from the time slot information device 324, the TX TS gate 318, or a combination thereof. For example, the gated time encoder may determine a value of the sensor identifier based on an activation signal (e.g., a control signal) from the TX TS gate 318 to enable the gated time encoder 310 to select the first sensor output signal of the multiple sensor output signals. When a second sensor output signal correspond to a second sensor is sent during a second time slot, the unique identity device 315 may indicate the identity of the sensor interface device 302 and a second sensor identifier corresponding to the second sensor. The first sensor identifier is different than the second sensor identifier.

During operation, the sensor interface device 302 may be coupled to the communication medium 340. The sensor interface device 302 may receive a timing signal (e.g., a bus clock signal) via the communication medium 340 and synchronize the sensor interface device 302 with one or more devices of a sensor network (e.g., a time division multiplexed sensor network). For example, the sensor interface device 302 may include the PLL 312 to receive the timing signal and to determine an output signal to synchronize one or more local frame clocks 314 based on the timing signal.

After the sensor interface device 302 is coupled to the communication medium, the automatic TS device 322 may monitor the communication medium 340 to identify a vacant time slot in the sensor network. When the automatic TS device 322 identifies a vacant slot, the automatic TS device 322 may select the vacant time slot as the TX fixed TS of the sensor interface device 302.

During an initial occurrence of the time slot after the vacant time slot is set as the TX fixed TS, the sensor interface device 302 may transmit at least a portion of the identity of the sensor interface device 302 via the communication medium 340. In one or more subsequent occurrences of the time slot, the sensor interface device 302 may communicate an analog signal that is representative of a sensor output signal received from a sensor. The analog signal may be generated and transmitted by the gated time encoder 310.

The sensor interface device 302 may also receive one or more analog signals during one or more time slots based on the RX fixed TS. During an occurrence of a time slot associated with the TX fixed TS, the gated low pass filter 330 may be selectively enabled to receive an analog signal from the communication medium 340. The gated low pass filter 330 may convert the received analog signal into a sensor input signal (e.g., a voltage signal) that is provided to one or more devices (e.g., one or more sensors) coupled to the sensor interface device 302. In a particular embodiment, the TX TS gate 318 and the RX TS gate 334 may be combined as a single gate controller.

Accordingly, the system 300 may be synchronized to the system clock to enable the gated time encoder 310 to generate an analog signal (e.g., a pulse width modulated analog signal) that is constrained to occur within the TX fixed TS assigned to the sensor interface device 302. The TX fixed TS may include multiple time slots that occur sequentially and allow the gated time encoder 310 to be enabled (e.g., gated) over the multiple time slots and to extend the inherent dynamic range of a single time slot. Additionally, one or more time slots within a sensor network system may be devoted to synchronization signals (e.g., regular pulsed signals of constant width) for use both in synchronization and power distribution. The sensor interface device 302 may advantageously be able to join the sensor network with a predetermined TX fixed TS or may join and automatically acquire and set the TX fixed TS.

Figure 4:
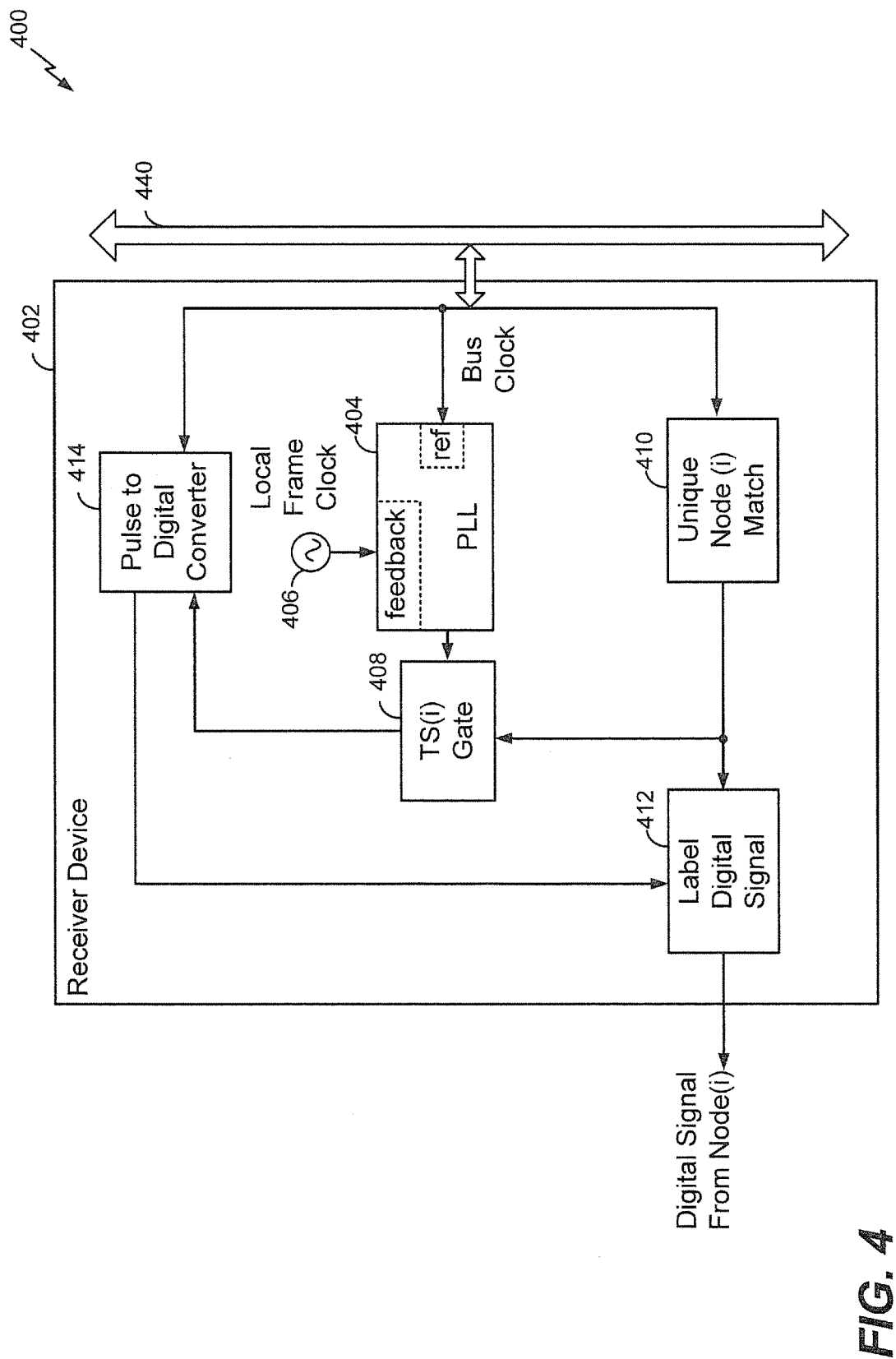
FIG. 4 is a block diagram illustrating a first particular embodiment of a receiver device.

Referring to FIG. 4, a particular embodiment of a system 400 including a receiver device 402 and a communication medium 440 is shown. For example, the receiver device 402 may include the receiver device 130 of FIG. 1. The receiver device 402 may receive an analog signal, such as the analog sensor data 154 of FIG. 1, from one or more devices via the communication medium 440. The one or more devices may include the sensor interface devices 114A-M or the clock 160 of FIG. 1, the sensor interface device 202 of FIG. 2, or the sensor interface device 302 of FIG. 3. The communication medium 440 may include the communication medium 120 of FIG. 1, the communication medium 204 of FIG. 2, or the communication medium 340 of FIG. 3. The receiver device 402 may include a pulse to digital converter 414, a PLL 404, a local frame clock 406, a TS gate 408, a unique node match device 410, and a label digital signal device 412.

The receiver device 402 may receive a bus clock signal, such as the timing signal 150 of FIG. 1, from the communication medium 440 to synchronize the receiver device 402. The receiver device 402 may be configured to receive analog signals via the communication medium 440 during one or more time slots of each frame of the plurality of frames. When the receiver device 402 is included in a sensor network, such as the sensor network of the system 100 of FIG. 1, the receiver device 402 may be synchronized to a system clock to identify one or more time slots. For example, the receiver device 402 may receive one or more timing signals that may include a clock signal or a synchronization pulse. The one or more timing signals may be associated with the system clock, such as the clock 160 of FIG. 1. The system clock may have a frequency based on period of a frame of a time division multiplexed system. In a particular embodiment, a particular timing signal may be provided to the receiver device 402 during a particular time slot of each frame of a plurality of frames.

In a particular embodiment, the receiver device 402 may maintain the local frame clock 406 and may synchronize the local frame clock 406 based on the system clock. The receiver device 402 may synchronize the local frame clocks 406 based on the one or more timing signals received via the communication medium 340. In a particular embodiment, the local frame clock 406 may be included in the TS gate 408. The local frame clock 406 may drift over time and may be re-synchronized based on an additional timing signal to maintain appropriate synchronization. The PLL 404 may be used to synchronize the local frame clock 406 based on timing signals, such as signals generated based on the bus clock. The PLL 404 may include a reference portion and a feedback portion. The PLL 404 may receive a timing signal at the reference portion and may receive the local frame clock 406 at the feedback portion. The PLL 404 may send the output signal to the local frame clock 406 so that the local frame clock 406 may be adjusted based on the output signal of the PLL 404.

The TS gate 408 may be configured to identify an occurrence of one or more time slots and to generate an activation signal that enables the pulse to digital converter 414 to receive an analog signal from the communication medium 440. The TS gate 408 may identify one or more time slots assigned to each of i devices included in the sensor network, where i is an integer.

The pulse to digital converter 414 may be configured to receive analog signals, such as analog sensor signals, communicated via the communication medium 440. The pulse to digital converter 414 may convert each received analog signal into a corresponding digital signal and send the corresponding digital signal to the label digital signal device 412. For example, the analog signals may be transmitted by one or more of the devices included in the sensor network. Based on a particular activation signal from the TS gate 408 received at the pulse to digital converter 414, the pulse to digital converter 414 may be gated during a particular time slot to enable the pulse to digital converter 414 to receive an analog signal during the particular time slot. In a particular embodiment, the pulse to digital converter 414 may include a bank of conventional low speed analog to digital converters (ADCs) that are configured in parallel. Each ADC of the bank of ADCs may be selectively enabled based on a different activation signal.

The unique node match device 410 may be communicatively coupled to the communication medium 440. The unique node match device 410 may be configured to receive an analog signal from the communication medium 440 during a time slot and to process the analog signals to determine an identity (e.g., an n-bit number) corresponding to a device associated with the analog signal. For example, the unique node match device 410 may be configured to receive the analog signal including the identity of a sensor interface device, such as one of the sensor interface devices 114A-M of FIG. 1, the sensor interface device 202 of FIG. 2, or the sensor interface device 302 of FIG. 3. The unique node match device 410 may store the identity (e.g., associated a sensor or sensor interface device) along with an indication of the time slot during which the identity was received. After storing the identity, the unique node match device 410 may provide the identity (e.g., a value the identity) to the label digital signal device 412 based on an occurrence of the time slot associated with the identity. For example, the unique node match device 410 may determine that a particular sensor interface device is assigned a tenth sequential time slot in a particular frame and may provide the identity of the particular sensor interface to the label digital signal device 412 during the tenth sequential time slot of one or more subsequent frames after the particular frame.

In a particular embodiment, when the receiver device 402 is included in a sensor network where one or more devices are configured to automatically select (e.g., assign) time slots, the unique node match device 410 may be configured to monitor one or more vacant time slots for an initial analog signal. The unique node match device 410 may detect when an analog signal is initially present in a vacant time slot and cause the analog signal to be processed as an identity value of a device that transmitted the analog value. For example, the unique node match device 410 may provide a signal to the label digital signal device 412 that causes the label digital signal device 412 to store a digital signal based on the analog signal at the unique node match device 410 as an identity. For example, the analog signal that is initially present in a previously vacant time slot may have a pulse width that represents the value of the identity.

In another particular embodiment, the unique node match device 410 may receive a portion of the identity of a particular device every p number of frames, where p is an integer. For example, every p frames the unique node match device 410 may receive a different bit of the identity during a time slot assigned to the particular device. The unique node match device 410 may determine each bit of the identity by assigning a bit value based on an analog value received in the time slot assigned to the particular device during a p frame. For example, the unique node match device 410 may determine each bit of the identity by assigning a bit value of one when the time slot assigned to the particular device during a p frame includes an analog value other than a zero value and assigning a value of zero when the time slot assigned to the particular device during a p frame includes an analog value has a zero value or no value. Alternatively, the unique node match device 410 may determine each bit of the identity by assigning a bit value of zero when the time slot assigned to the particular device during a p frame includes an analog value other than a zero value and assigning a value of one when the time slot assigned to the particular device during a p frame includes an analog value has a zero value or no value. The unique node match device 410 may accumulated the bit values of the identity of the particular device and maintain a list of identity values for each time slot. During each time slot, the unique node match device 410 may access the list and provide an identity value corresponding to the time slot to the label digital signal device 412.

The label digital signal device 412 may receive a digital representation of an analog signal from the pulse to digital converter 414 and send the digital data including the digital representation of the analog signal to a processing/storage device, such as the processing/storage device 140 of FIG. 1.

Prior to sending the digital data to the processing/storage device, the label digital signal device 412 may attach an identifier to the digital data. The identifier attached to the digital data may correspond to a device that was associated with generation of the analog signal from which the digital data was produced. Alternatively or additionally, the label digital signal device 412 may attach a time stamp to the digital data. A value of the time stamp may be associated with a time that the digital data was generated, a time that the analog signal used to generate the digital data was received, or a time when the analog signal was generated.

During operation, the receiver device 402 may be coupled to the communication medium 440. The receiver device 402 may receive a timing signal (e.g., a bus clock signal) via the communication medium 440 and may synchronize the receiver device 402 with one or more devices of a sensor network (e.g., a time division multiplexed sensor network). For example, the receiver device 402 may include the PLL 404 to receive the timing signal and to determine an output signal to synchronize the local frame clock 406 based on the timing signal.

During a first time slot, the receiver device 402 may receive first analog sensor data from a first device via the communication medium 440. The first analog sensor data may include a pulse width modulated representation of a first sensor signal (e.g., first sensor data) generated by a first sensor. The pulse to digital converter 414 may convert the first analog sensor data into first digital sensor data representative of the first sensor signal. The receiver device 402 may send the first digital sensor data to a processing system or a storage system, such as the processing/storage systems 140 of FIG. 1.

During a second time slot, the receiver device 402 may receive second analog sensor data from a second device via the communication medium 440. The second analog sensor data may include a pulse width modulated representation of a second sensor signal (e.g., second sensor data) generated by a second sensor. The pulse to digital converter 414 may convert the second analog sensor data into second digital sensor data representative of the second sensor signal. The receiver device 402 may send the second digital sensor data to the processing system or the storage system.

In a particular embodiment, the receiver device 402 may not include the unique node match device 410, and the label digital signal device 412 may store one or more identities corresponding to devices from which the receiver device 402 receives analog signals. For example, each device may be assigned one or more time slots during which the device may be enabled to transmit analog signals. During an occurrence of a particular time slot assigned to a particular device, the pulse to digital converter 414 will receive an analog signal transmitted by the particular device and subsequently convert the analog signal into a digital signal. The label digital signal device 412 may receive the digital signal and attach an identifier that corresponds to the particular device based on the particular time slot during which the analog signal was received by the pulse to digital converter 414.

By receiving analog signals from multiple devices included in a sensor network, the receiver device 402 may operate as an interface to a data collection point. The receiver device 402 may convert each of the received analog signals into a digital signal and provide the digital signal to a processing system or a storage system. Additionally, the receiver device 402 may attach an identity to each digital signal based on a device that sent the analog signal that the digital signal is based on. Because the receiver device 402 performs the analog to digital conversion for each of the received analog signals, the one or more devices included in the sensor network do not need to include analog to digital conversion circuitry. The receiver device 402 may also be able to advantageously receive and identify an identity (e.g., an identifier) of a device communicating during a particular time slot based on an analog signal transmitted during the particular time slot. By identifying the identity of the device during the particular time slot, the receiver device 402 may support the particular device dynamically joining the sensor network and automatically selecting one or more vacant time slots during which the particular device transmits analog signals.

Figure 5:
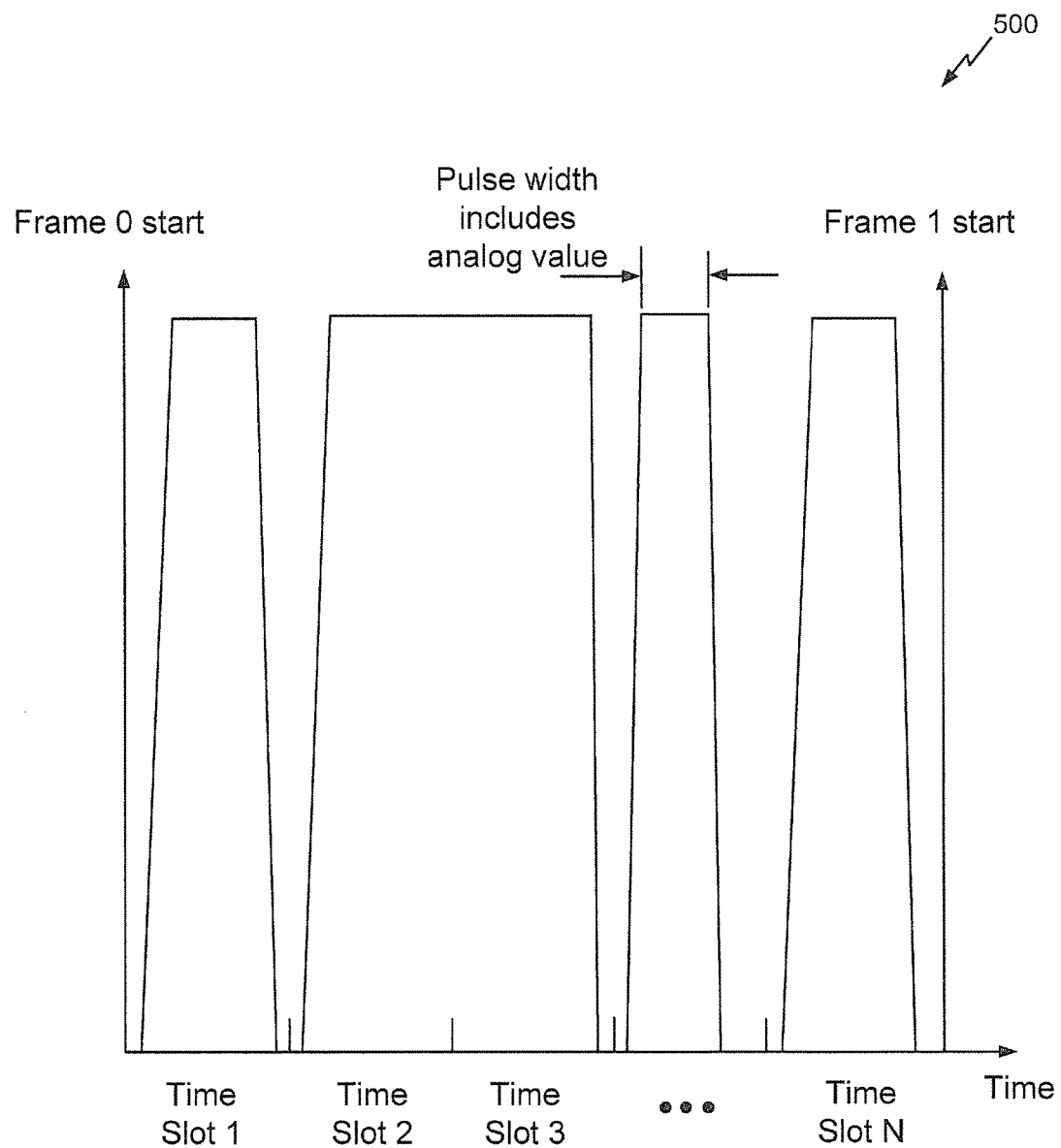
FIG. 5 is a graph illustrating pulse width modulated signals in different time slots of a frame.

Referring to FIG. 5, an illustrative graph 500 of analog signals communicated via a communication medium of a time-slotted network (e.g., a time division multiplexed network) is shown. The communication medium may include the communication medium 120 of FIG. 1, the communication medium 204 of FIG. 2, the communication medium 340 of FIG. 3, or the communication medium 440 of FIG. 4. The time-slotted network may use time-division multiplexing (TDM) using a plurality of frames. Each frame of the plurality of frames may include a plurality of time slots (e.g., channels).

In the graph 500, a first frame (e.g., frame 0) includes a plurality of time slots (e.g., time slots 1-N). A number of time slots may be based at least on a number of devices included in the time-slotted network that need to communicate data. One or more devices included in the time-slotted network may be assigned multiple time slots. For example, a first time slot may be assigned to a first device, a second time slot and a third time slot may be assigned to a second device, and an Nth time slot may be assigned to an Nth device. During a particular time slot, a particular device assigned to the particular time slot may transmit an analog signal, such as an analog pulse width modulated signal, to be received by one or more other devices included in the time-slotted network. For example, when one time slot (e.g., one transmit time slot) is assigned to the first device, the first device may transmit an analog signal having a pulse width that begins and ends within the first time slot. As another example, when two time slots (e.g., two transmit time slots) are assigned to the second device, the second device may transmit an analog signal having a pulse width that begins in the second time slot and ends in the third time slot. A pulse width of the analog signal may correspond to an analog value. In a particular embodiment, the particular device is associated with a sensor, and the analog value is representative of sensor data generated by the sensor. In a particular embodiment, the first device may include a system clock, and a signal transmitted via the communication medium during the first time slot by the system clock may be a synchronization signal.

Figure 6:
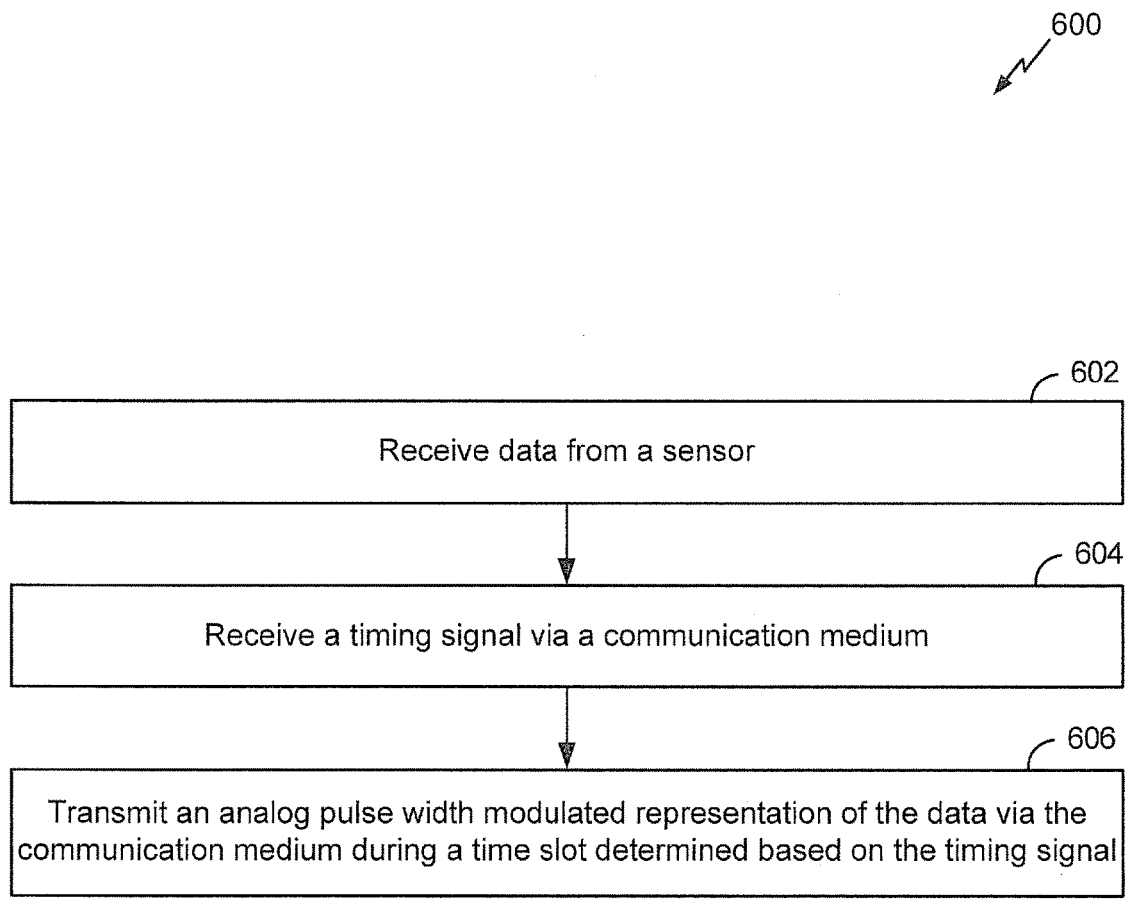
FIG. 6 is a flow diagram of operation of a sensor interface device.

FIG. 6 is a flow chart illustrating a method 600 of operating a sensor interface device. The sensor interface device may include one of the sensor interface devices 114A, 114B, 114M of FIG. 1, the sensor interface device 202 of FIG. 2, or the sensor interface device 302 of FIG. 3.

In the method 600, data is received from a sensor, at 602. The sensor interface device may be coupled to the sensor and may receive sensor data, such as the sensor data 152 of FIG. 1, from the sensor. For example, the sensor may include one of the sensors 112A-M of FIG. 1.

A timing signal is received via a communication medium, at 604. For example, the communication medium may include the communication medium 120 of FIG. 1, the communication medium 204 of FIG. 2, the communication medium 340 of FIG. 3, or the communication medium 440 of FIG. 4. The sensor interface device may use the timing signal to maintain (e.g., synchronize) a clock (e.g., a local clock of the sensor interface device) based on the timing signal. The clock may enable the sensor interface device to identify one or more time slots assigned to the sensor interface device during which the sensor interface device may communicate (e.g., send or receive) analog signals.

An analog pulse width modulated representation of the data may be transmitted via the communication medium during a time slot determined based on the timing signal, at 606. The analog pulse width modulated representation of the data may be transmitted to one or more devices via the communication medium. The analog pulse width modulated representation of the data may be generated by a gated time encoder of the sensor interface device during the time slot. A transmission of the analog pulse width modulated representation of the data may be enabled based on switch of the gated time encoder that is activated at a beginning of the time slot. The transmission of the analog pulse width modulated representation of the data may include combining (e.g., mixing) a carrier signal with the analog pulse width modulated representation of the data prior to transmitting the analog pulse width modulated representation.

The method 600 of FIG. 6 may be initiated or controlled by a field-programmable gate array (FPGA) device, an application-specific integrated circuit (ASIC), a processing unit, such as a central processing unit (CPU), a digital signal processor (DSP), a controller, another hardware device, a firmware device, or any combination thereof. As an example, the method 600 of FIG. 6 can be initiated or controlled by one or more processors include in or coupled to one of the sensor interface devices 114A, 114B, 114M of FIG. 1, the sensor interface device 202 of FIG. 2, or the sensor interface device 302 of FIG. 3.

Figure 7:
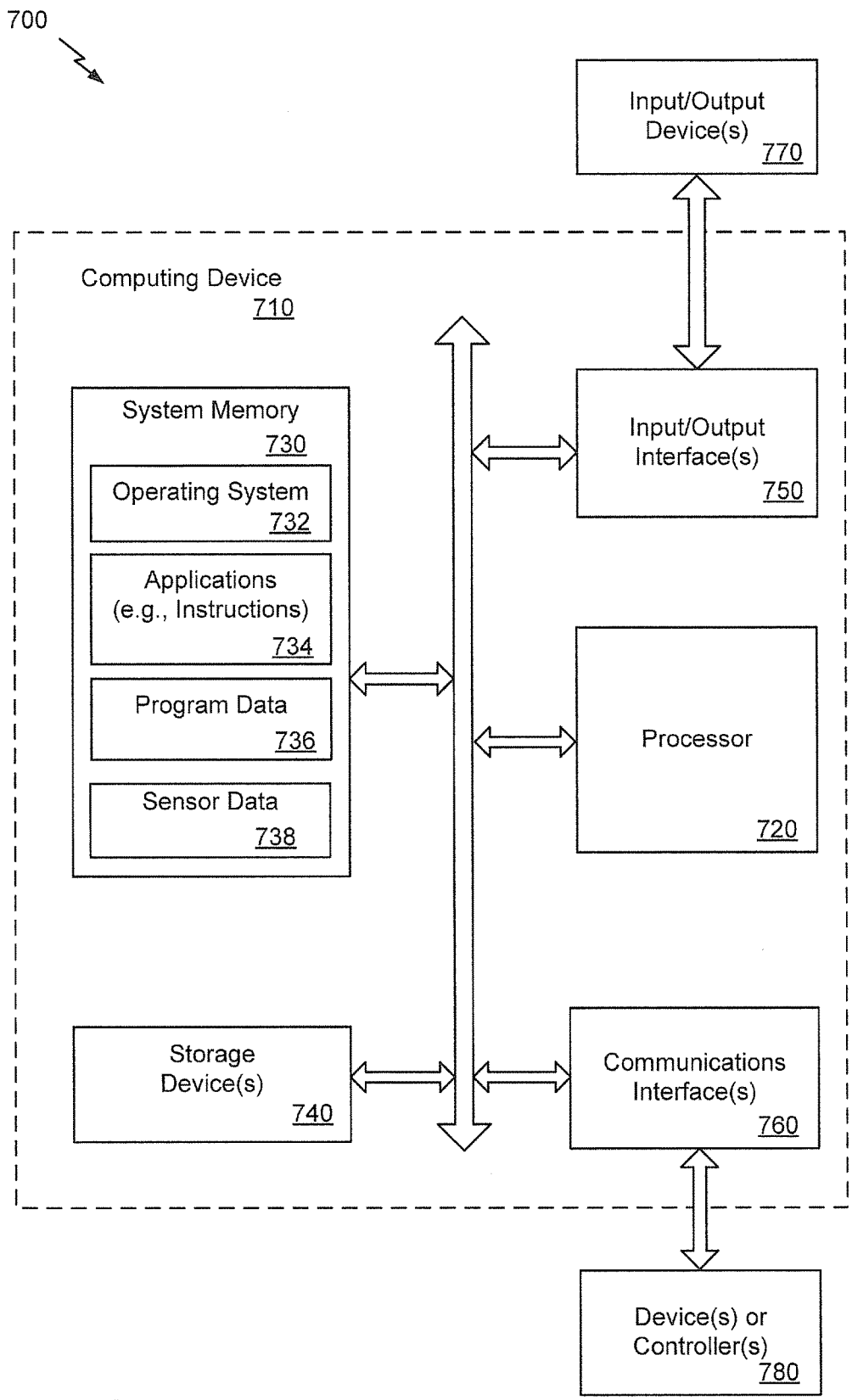
FIG. 7 is a block diagram illustrating a particular embodiment of a computing system, such as a device of a sensor network.

FIG. 7 is a block diagram of a computing environment 700 including a computing device 710 operable to support a sensor network. For example, the computing device 710, or portions thereof, may be included within or correspond to the sensor interface devices 114A-M, the receiver device 130, or the processing/storage systems 140 of FIG. 1, the sensor interface device 202 of FIG. 2, the sensor interface device 302 of FIG. 3, or the receiver device 402 of FIG. 4.

The computing device 710 may include at least one processor 720. Within the computing device 710, the at least one processor 720 may communicate with a system memory 730, one or more storage devices 740, one or more input/output interfaces 750, one or more communications interfaces 760, or a combination thereof.

The system memory 730 may include volatile memory devices (e.g., random access memory (RAM) devices), nonvolatile memory devices (e.g., read-only memory (ROM) devices, programmable read-only memory, and flash memory), or both. The system memory 730 may include an operating system 732, which may include a basic input/output system for booting the computing device 710 as well as a full operating system to enable the computing device 710 to interact with users, other programs, and other devices. The system memory 730 may also include one or more applications (e.g., instructions) 734, program data 736, and sensor data 738. The program data 736 may include data used by the applications 734 to perform respective functions of the applications 734. The applications 734 may include instructions executable by the at least one processor 720 to determine sensor data, sensor identifiers, sensor interface device identifiers, sensor time slot allocation information, sensor interface device time slot allocation information, other information relate to a sensor network, or a combination thereof. The sensor data 738 may include digital data representative of raw sensor data, data that is analyzed or processed by the applications 734 to determine information relate to a sensor network, or a combination thereof.

The one or more storage devices 740 may include non-volatile storage devices, such as magnetic disks, optical disks, or flash memory devices. The storage devices 740 may include both removable and non-removable memory devices. In a particular embodiment, the storage devices 740 may be configured to store the operating system 732, the applications 734, the program data 736, the sensor data 738, or a combination thereof. The system memory 730, the storage devices 740, or both, may include tangible, non-transitory computer-readable media or storage devices.

In a particular embodiment, the at least one processor 720 is configured to execute computer executable instructions, such as the applications 734, stored at a non-transitory computer-readable medium, such as the system memory 730. The instructions may be executable to cause the at least one processor 720 to receive or process, from a node (e.g., a sensor, a sensor interface device, or a receiver device) of a sensor network, data, such as sensor data, identification data, control data, or timing data, associated with the sensor network. The instructions may be executable to cause the at least one processor 720 to receive data from a sensor. The computer executable instructions may further be executable to cause the at least one processor 720 to receive a timing signal via a communication medium. The computer executable instructions may further be executable to cause the at least one processor 720 to transmit an analog pulse width modulated representation of the data via the communication medium during a time slot determined based on the timing signal.

The one or more input/output interfaces 750 may enable the computing device 710 to communicate with one or more input/output devices 770 to facilitate user interaction. For example, the one or more input/output interfaces 750 may be adapted to receive input from a user, to receive input from another computing device, or a combination thereof. The input/output interfaces 750 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 770 may include user interface devices and displays, including some combination of buttons, keyboards, pointing devices, displays, speakers, microphones, touch screens, and other devices.

The one or more communications interfaces 760 may enable the computing device 710 to communicate with one or more other computing devices or controllers 780. The one or more communications interfaces 760 may include wired Ethernet interfaces, Institute of Electrical and Electronics Engineers (IEEE) 702 wireless interfaces, Bluetooth communication interfaces, electrical (or power line) interfaces, optical or radio frequency interfaces, or other wired or wireless interfaces. The other computer devices or controllers 780 may include host computers, servers, workstations, portable computers, telephones, tablet computers, or any other communication device or component. For example, the other computer devices or controllers 780 may include the sensor interface devices 114A-M, the receiver device 130, or the processing/storage systems 140 of FIG. 1, the sensor interface device 202 of FIG. 2, the sensor interface device 302 of FIG. 3, the receiver device 402 of FIG. 4, or other devices described with reference to FIGS. 1-6.

Figure 8:
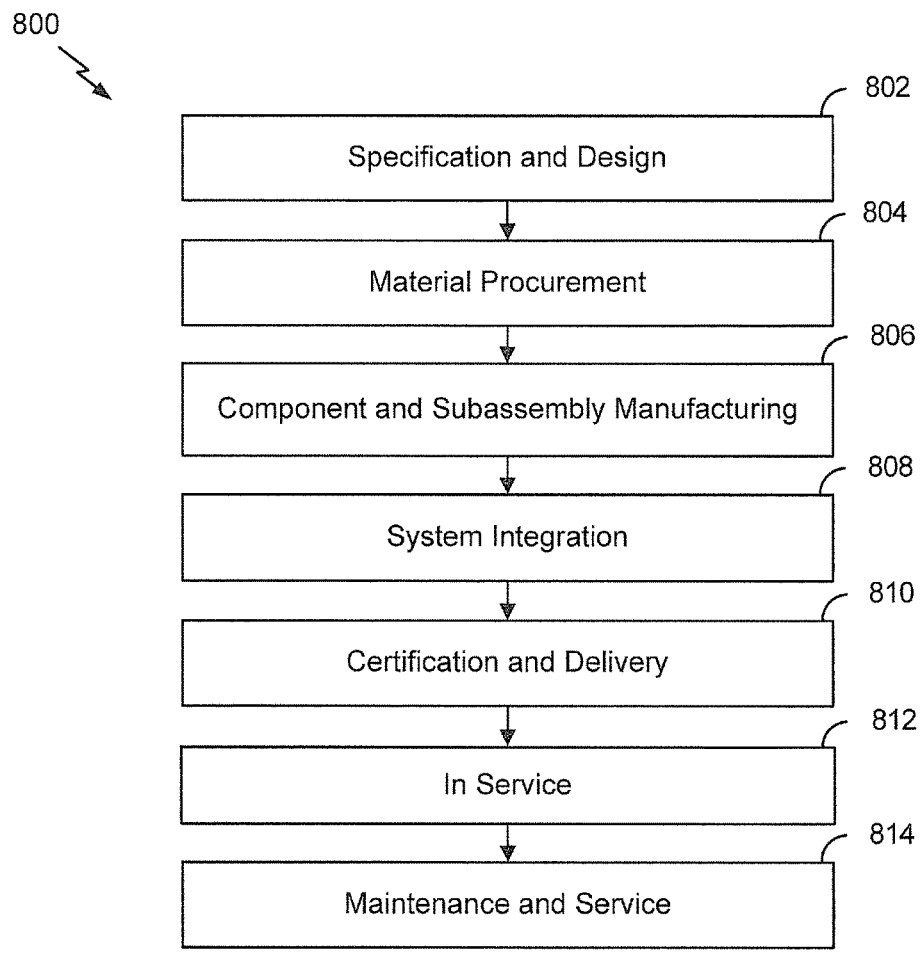
FIG. 8 is a flow diagram of a vehicle production and service methodology.
Figure 9:
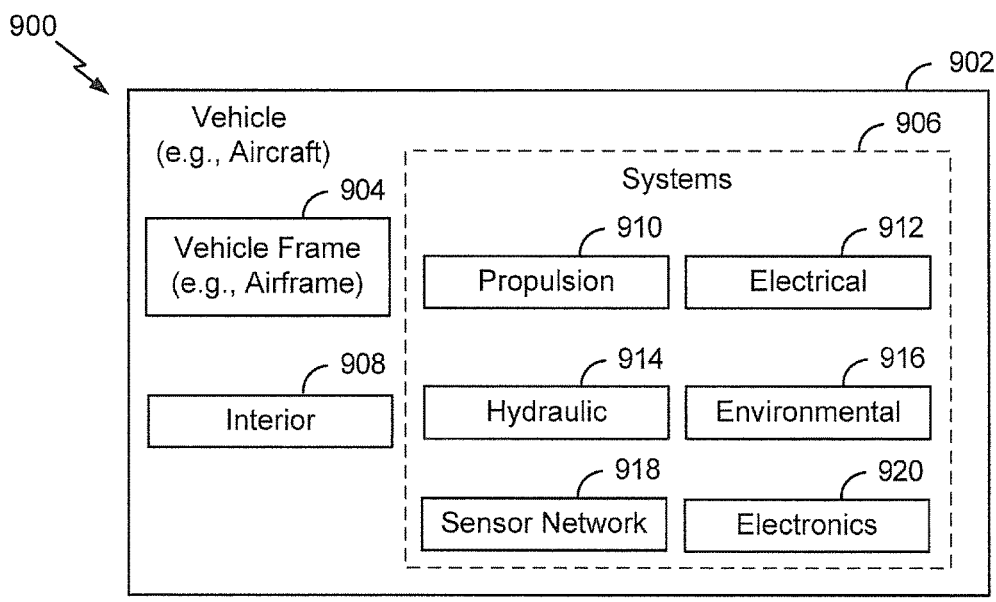
FIG. 9 is a block diagram of a vehicle including a sensor network.

Referring to FIGS. 8 and 9, examples of the disclosure are described in the context of a vehicle manufacturing and service method 800 as illustrated by the flow chart of FIG. 8 and a vehicle system 900 as illustrated by the block diagram of FIG. 9. A vehicle produced by the vehicle manufacturing and service method 800 of FIG. 8 and a vehicle 902 of FIG. 9 may include an aircraft, a watercraft, a land craft, a spacecraft, or combinations thereof. The methods 900 and 800 may also be modified to produce and service a structure, such as a building or a bridge, having one or more systems to operate or monitor the structure.

Referring to FIG. 8, during pre-production, the method 800 may include specification and design 802 of the vehicle 902 and material procurement 804. For example, sensor network systems (e.g., a sensor network system 918 of FIG. 9) may be designed and specified.

During production, component and subassembly manufacturing 806 and system integration 808 of the vehicle 902 takes place. For example, the sensor network systems may be produced as sub-assemblies and integrated within the vehicle 902. Thereafter, the vehicle 902 may go through certification and delivery 810 in order to be placed in service 812. While in service by a customer, the vehicle 902 may be scheduled for routine maintenance and service 814 (which may also include modification, reconfiguration, refurbishment, and so on). For example, when the sensor network systems were not originally installed on the vehicle 902, the vehicle 902 may be reconfigured, during maintenance and service 814, to include the sensor network systems. Additionally, the sensor network systems may be used, during maintenance and service 814, to diagnosis problems with one or more other systems.

Each of the processes of the vehicle manufacturing and service method 800 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be a transportation company (e.g., an airline), a leasing company, a military entity, a service organization, and so on.

As shown in FIG. 9, the vehicle system 900 includes the vehicle 902 produced by the vehicle manufacturing and service method 800. The vehicle 902 may include a vehicle frame 904 (e.g., an airframe) with a plurality of systems 906 and an interior 908. Examples of high-level systems 906 include one or more of a propulsion system 910, the electrical system 912, a hydraulic system 914, an environmental system 916, the sensor network system 918, and an electronics system 920. Any number of other systems may be included. In a particular embodiment, the sensor network system 918 may be independent of or included in one or more of the other systems.

Apparatus and methods embodied herein may be employed during any one or more of the stages of the vehicle manufacturing and service method 800. For example, components or subassemblies corresponding to a production process may be fabricated or manufactured in a manner similar to components or subassemblies produced while the vehicle 902 is in service. Also, one or more apparatus embodiments, method embodiments, or a combination thereof may be utilized during the production stages (e.g., the component subassembly manufacturing stage 806 and the system integration stage 808), for example, by substantially expediting assembly of or reducing the cost of the vehicle 902. Similarly, one or more of apparatus embodiments, method embodiments, or a combination thereof may be utilized while the vehicle 902 is in service, for example and without limitation, to maintenance and service 814.

In these illustrative examples, the sensor network system 918 may be implemented in the vehicle 902 during system integration 808 or maintenance and service 814. The sensor network system 918, in accordance with one or more embodiments disclosed herein, may be used while in service 812 and/or during maintenance and service 814.

Examples described above illustrate but do not limit the disclosure. It should also be understood that numerous modifications and variations are possible in accordance with the principles of the present disclosure. Accordingly, the scope of the disclosure is defined only by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A device comprising:
  a bus interface to couple to a shared bus of a sensor network;
  a sensor interface to couple to a sensor of the sensor network;
  a gated pulse width modulation circuit coupled to the bus interface and to the sensor interface, the gated pulse width modulation circuit configured to transmit, during a time slot, an analog pulse width modulated representation of a signal received from the sensor;
  a second circuit coupled to the bus interface and to the sensor interface, the second circuit configured to receive a second signal via the shared bus and to provide a representation of the second signal to the sensor, wherein the representation of the second signal includes sensor data from a second sensor; and
  a time slot assignment device coupled to the bus interface and configured to assign the time slot to the sensor in response to no transmission from another device being detected on the shared bus in the time slot during a monitoring time period, wherein the time slot assignment device identifies a first particular time slot to monitor based on a device identifier associated with the sensor.

2. The device of claim 1, wherein the time slot assignment device identifies a second particular time slot to monitor in response to a transmission from another device being detected on the shared bus in the first particular time slot, and wherein the second particular time slot is immediately subsequent to the first particular time slot.

3. The device of claim 1, wherein the time slot corresponds to a media access time during each frame of a plurality of frames that is allocated to the device for transmission on the shared bus, and wherein the monitoring time period includes the first particular time slot and a second particular time slot, wherein the first particular time slot corresponds to a first frame of the plurality of frames, and wherein the second particular time slot corresponds to a second frame of the plurality of frames.

4. The device of claim 3, wherein the gated pulse width modulation circuit is configured to transmit the analog pulse width modulated representation of the signal received from the sensor during the first frame of the plurality of frames and transmit at least a portion of a node identifier of the device during the second frame of the plurality of frames.

5. The device of claim 1, wherein the second circuit includes a low pass filter, wherein the low pass filter converts the second signal from an analog pulse width modulated format to the representation of the second signal, and wherein the representation of the second signal is an analog signal.

6. The device of claim 5, wherein the low pass filter includes an integrator, and wherein the low pass filter is configured to receive the second signal during a second time slot distinct from the time slot.

7. The device of claim 1, further comprising a receiver configured to:
receive analog pulse width modulation data via the shared bus during a second time slot;
convert the analog pulse width modulation data into a digital signal; and
provide a digital sensor record to a processor.

8. The device of claim 7, wherein the digital sensor record includes a value that corresponds to the digital signal, an identifier associated with a particular sensor the analog pulse width modulation data originated from, and a time stamp.

9. The device of claim 8, wherein the identifier corresponds to a particular digital signal converted from a particular analog signal received in a second particular time slot corresponding to the particular sensor.

10. A sensor network comprising:
multiple sensors;
a bus; and
multiple sensor interface devices, each sensor interface device of the multiple sensor interface devices coupling one or more sensors of the multiple sensors to the bus, wherein a first sensor interface device of the multiple sensor interface devices includes:
a bus interface coupled to the bus;
a sensor interface coupled to a first corresponding sensor of the multiple sensors;
a gated pulse width modulation circuit coupled to the bus interface and to the sensor interface, the gated pulse width modulation circuit configured to transmit, during a time slot, an analog pulse width modulated representation of a signal received from the first corresponding sensor;
a second circuit coupled to the bus interface and to the sensor interface, the second circuit configured to receive a second signal via the bus and to provide a representation of the second signal to the first corresponding sensor, wherein the representation of the second signal includes sensor data from a second sensor of the multiple sensors; and
a time slot assignment device coupled to the bus interface and configured to assign the time slot to the first corresponding sensor in response to no transmission from another device being detected on the bus in the time slot during a monitoring time period, wherein the time slot assignment device identifies a first particular time slot to monitor based on a device identifier associated with the sensor.

11. The sensor network of claim 10, integrated in a structure, wherein the structure includes an aircraft, a spacecraft, a land craft, a watercraft, a mobile platform, an infrastructure platform, or a building.

12. The sensor network of claim 10, further comprising a receiver coupled to the bus and configured to receive, during the time slot, the analog pulse width modulated representation, wherein the receiver is further configured to convert the analog pulse width modulated representation into a digital signal.

13. A method comprising:
monitoring a bus during a monitoring time period;
identifying a first particular time slot to monitor based on a device identifier;
assigning a time slot to a sensor in response to no transmission from another device being detected on the bus in the time slot during the monitoring time period;
receiving a first signal including data from the sensor;
transmitting an analog pulse width modulated representation of the data via the bus during the time slot; and
providing, during a second time slot, a representation of a second signal to the sensor, the second signal received via the bus, wherein the representation of the second signal includes sensor data from a second sensor.

14. The method of claim 13, further comprising activating a switch based on identification of a beginning of a subsequent time slot corresponding to the time slot to enable a transmission of the analog pulse width modulated representation of the data.

15. The method of claim 13, further comprising generating the analog pulse width modulated representation of the data during the time slot.

16. The method of claim 13, further comprising combining a carrier signal with the analog pulse width modulated representation of the data prior to transmitting the analog pulse width modulated representation of the data via the bus.

17. The device of claim 1, wherein the time slot assignment device is further configured to receive a timing signal during a second time slot reserved for synchronization of a plurality of sensor interface devices.

18. The device of claim 1, wherein the second circuit includes a gated low pass filter configured to provide the representation of the second signal to the sensor during a second time slot.

19. The sensor network of claim 10, wherein the second circuit comprises a selector configured to selectively provide the representation of the second signal to the second sensor during a second time slot assigned to the second sensor by the time slot assignment device.

20. The method of claim 13, wherein the data is generated based on the sensor data.

* * * * *